US010929696B2

(12) United States Patent
Zaba et al.

(10) Patent No.: US 10,929,696 B2
(45) Date of Patent: Feb. 23, 2021

(54) METHOD, APPARATUS, AND SYSTEM FOR DETERMINING A NEGATIVE OBSERVATION OF A ROAD FEATURE

(71) Applicant: HERE GLOBAL B.V., Eindhoven (NL)

(72) Inventors: Sebastian Zaba, Frankfort, IL (US); Leon Stenneth, Chicago, IL (US); Prashant Chauhan, Mount Prospect, IL (US); Lakshmi Nookala, Arlington Heights, IL (US); Pradeepa Kavindapadi Nagarajan, Chicago, IL (US); Yu Yang Bai, Chicago, IL (US)

(73) Assignee: HERE Global B.V., Eindhoven (NL)

( * ) Notice: Subject to any disclaimer, the term of this patent is extended or adjusted under 35 U.S.C. 154(b) by 271 days.

(21) Appl. No.: 15/957,559

(22) Filed: Apr. 19, 2018

(65) Prior Publication Data
US 2019/0325236 A1   Oct. 24, 2019

(51) Int. Cl.
*G06K 9/00* (2006.01)
*G06K 9/62* (2006.01)
(Continued)

(52) U.S. Cl.
CPC ..... *G06K 9/00818* (2013.01); *G06F 16/2246* (2019.01); *G06F 16/29* (2019.01); *G06K 9/627* (2013.01); *G06N 20/00* (2019.01)

(58) Field of Classification Search
CPC ................ G06K 9/00818; G06K 9/627; G06F 16/2246; G06F 16/29
(Continued)

(56) References Cited

U.S. PATENT DOCUMENTS 8,725,394 B2 * 5/2014 Bahlmann ............ G08G 1/0962
                                                                701/117
9,092,695 B1 * 7/2015 Ogale .................. G06K 9/6202
(Continued)

FOREIGN PATENT DOCUMENTS

WO     2014072141 A1    5/2014

OTHER PUBLICATIONS

Ouyang et al., "Truth Discovery in Crowdsourced Detection of Spatial Events", Published 2014 in IEEE Transactions in Knowledge and Data Engineering, vol. 28, Issue: 4, Apr. 1, 2016, retrieved on Mar. 9, 2018 from https://eprints.soton.ac.uk/403233/1/TKDE2504928.pdf, pp. 1-14.

*Primary Examiner* — Peter D Nolan
*Assistant Examiner* — Wae L Louie
(74) *Attorney, Agent, or Firm* — Ditthavong & Steiner, P.C.

(57) ABSTRACT

An approach is provided for determining a negative observation of a road feature (e.g., traffic sign). The approach involves, for example, querying a spatial data structure for a set of location points based on a spatial radius around a location of the road feature. The spatial data structure stores a plurality of location points from a plurality of location traces that did not have a road feature observation. The approach also involves map matching each location trace in the set of location points to a matched path of road links. The approach further involves determining that said each location trace is a negative observation of the road feature based on determining that the location of the road feature falls between two map-matched location points of said each location trace that are on the matched path of road links.

20 Claims, 19 Drawing Sheets

(51) Int. Cl.
*G06N 20/00* (2019.01)
*G06F 16/29* (2019.01)
*G06F 16/22* (2019.01)

(58) Field of Classification Search
USPC .......................................................... 701/532
See application file for complete search history.

(56) References Cited

U.S. PATENT DOCUMENTS

| 9,459,626 | B2* | 10/2016 | Chen | G08G 1/0129 |
| 2009/0138497 | A1* | 5/2009 | Zavoli | G01C 21/32 |
| 2014/0063232 | A1* | 3/2014 | Fairfield | B60T 7/18 |
| | | | | 348/118 |
| 2014/0303806 | A1* | 10/2014 | Bai | G06Q 50/01 |
| | | | | 701/1 |

* cited by examiner

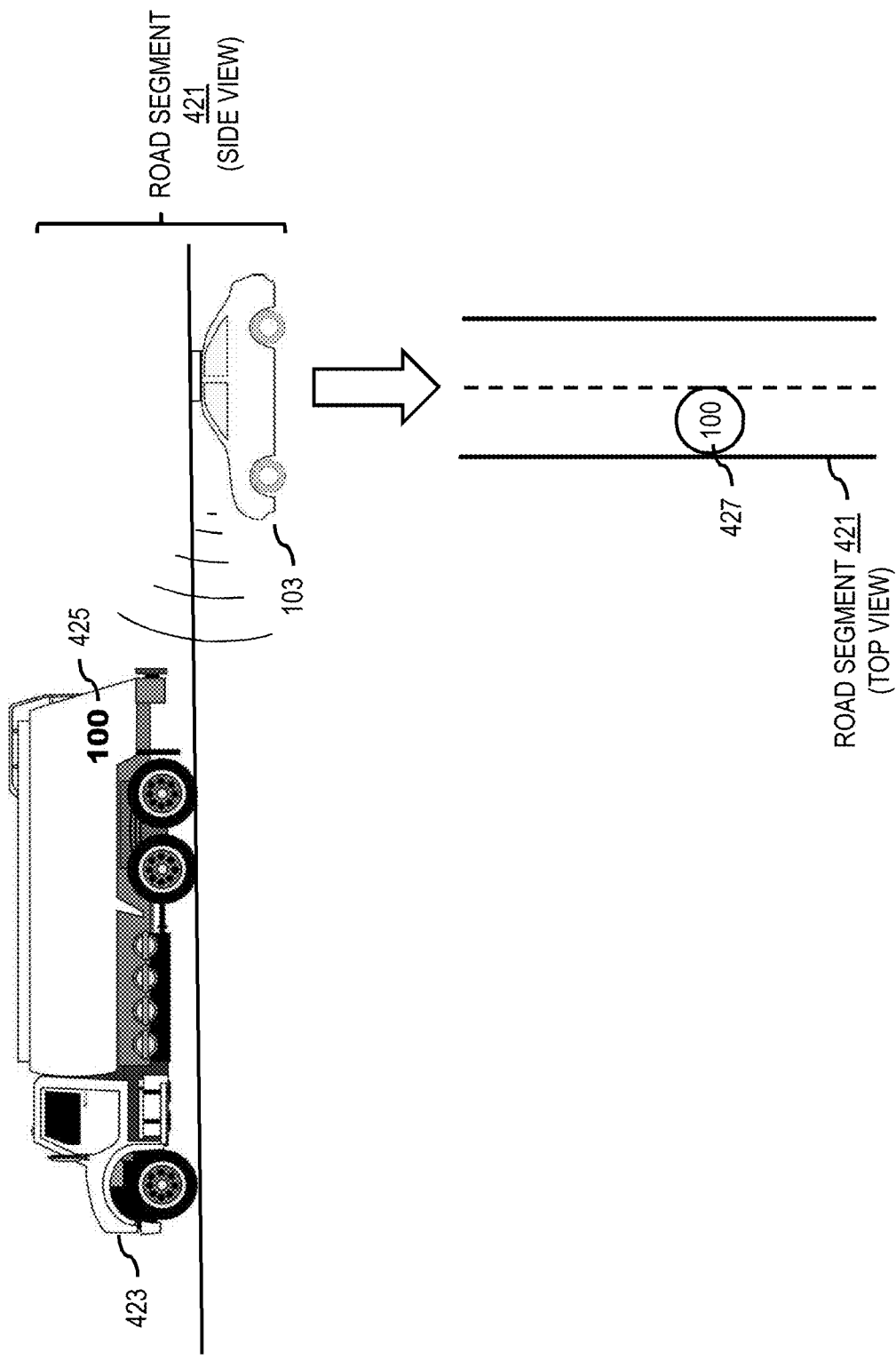

METHOD, APPARATUS, AND SYSTEM FOR DETERMINING A NEGATIVE OBSERVATION OF A ROAD FEATURE

BACKGROUND

Advances in computer vision systems and feature detectors (e.g., machine learning based feature detectors such as neural networks) are leading to accelerated development of autonomous driving and related mapping/navigation services. For example, such computer vision systems can be used to detect and recognize road features (e.g., traffic or other road signs, physical dividers, etc.) to help automate and improve autonomous driving and mapping/navigation functions. Historically, development of feature detection systems has focused on reporting when road features are detected on a road link as opposed to when the road features are not detected (i.e., a negative observation of a road feature). However, negative observation data can also be important for some use cases, thereby presenting technical challenges for service providers to obtain negative observation data.

SOME EXAMPLE EMBODIMENTS

Therefore, there is a need for an approach for determining a negative observation of a road feature (e.g., traffic or road sign).

According to one embodiment, a computer-implemented method comprises querying a spatial data structure for a set of location points based on a spatial radius around a location of a road feature (e.g., traffic sign). The spatial data structure stores a plurality of location points from a plurality of location traces that did not have a road feature observation. The method also comprises map matching each location trace in the set of location points to a matched path of road links. The method further comprises determining that said each location trace is a negative observation of the road feature based on determining that the location of the road feature falls between two map-matched location points of said each location trace that are on the matched path of road links.

According to another embodiment, an apparatus comprises at least one processor, and at least one memory including computer program code for one or more computer programs, the at least one memory and the computer program code configured to, with the at least one processor, cause, at least in part, the apparatus to query a spatial data structure for a set of location points based on a spatial radius around a location of a road feature. The spatial data structure stores a plurality of location points from a plurality of location traces that did not have a road feature observation. The apparatus is also caused to map match each location trace in the set of location points to a matched path of road links. The apparatus is further caused to determine that said each location trace is a negative observation of the road feature based on determining that the location of the road feature falls between two map-matched location points of said each location trace that are on the matched path of road links.

According to another embodiment, a non-transitory computer-readable storage medium carries one or more sequences of one or more instructions which, when executed by one or more processors, cause, at least in part, an apparatus to query a spatial data structure for a set of location points based on a spatial radius around a location of a road feature. The spatial data structure stores a plurality of location points from a plurality of location traces that did not have a road feature observation. The apparatus is also caused to map match each location trace in the set of location points to a matched path of road links. The apparatus is further caused to determine that said each location trace is a negative observation of the road feature based on determining that the location of the road feature falls between two map-matched location points of said each location trace that are on the matched path of road links.

According to another embodiment, an apparatus comprises means for querying a spatial data structure for a set of location points based on a spatial radius around a location of a road feature. The spatial data structure stores a plurality of location points from a plurality of location traces that did not have a road feature observation. The method also comprises map matching each location trace in the set of location points to a matched path of road links. The method further comprises determining that said each location trace is a negative observation of the road feature based on determining that the location of the road feature falls between two map-matched location points of said each location trace that are on the matched path of road links.

According to another embodiment, a computer-implemented method comprises retrieving a plurality of location points from a plurality of location traces collected from sensors of vehicles traveling in a road network. The plurality of location points did not road feature observations reported by the vehicles. The method also comprises storing the plurality of location points into a spatial data structure. The spatial data structure indexes the plurality of location points according to location. In addition, the spatial data structure can be queried to identify a subset of the plurality of location points within a spatial radius of a road feature, and the subset of the plurality of location points can be processed to determine a negative observation of the road feature.

According to another embodiment, an apparatus comprises at least one processor, and at least one memory including computer program code for one or more computer programs, the at least one memory and the computer program code configured to, with the at least one processor, cause, at least in part, the apparatus to retrieve a plurality of location points from a plurality of location traces collected from sensors of vehicles traveling in a road network. The plurality of location points did not road feature observations reported by the vehicles. The apparatus is also caused to store the plurality of location points into a spatial data structure. The spatial data structure indexes the plurality of location points according to location. In addition, the spatial data structure can be queried to identify a subset of the plurality of location points within a spatial radius of a road feature, and the subset of the plurality of location points can be processed to determine a negative observation of the road feature.

According to another embodiment, a non-transitory computer-readable storage medium carries one or more sequences of one or more instructions which, when executed by one or more processors, cause, at least in part, an apparatus to retrieve a plurality of location points from a plurality of location traces collected from sensors of vehicles traveling in a road network. The plurality of location points did not road feature observations reported by the vehicles. The apparatus is also caused to store the plurality of location points into a spatial data structure. The spatial data structure indexes the plurality of location points according to location. In addition, the spatial data structure can be queried to identify a subset of the plurality of location points within a spatial radius of a road feature, and the subset of the plurality of location points can be processed to determine a negative observation of the road feature.

According to another embodiment, an apparatus comprises means for retrieving a plurality of location points from a plurality of location traces collected from sensors of vehicles traveling in a road network. The plurality of location points did not road feature observations reported by the vehicles. The apparatus also comprises means for storing the plurality of location points into a spatial data structure. The spatial data structure indexes the plurality of location points according to location. In addition, the spatial data structure can be queried to identify a subset of the plurality of location points within a spatial radius of a road feature, and the subset of the plurality of location points can be processed to determine a negative observation of the road feature.

In addition, for various example embodiments of the invention, the following is applicable: a method comprising facilitating a processing of and/or processing (1) data and/or (2) information and/or (3) at least one signal, the (1) data and/or (2) information and/or (3) at least one signal based, at least in part, on (or derived at least in part from) any one or any combination of methods (or processes) disclosed in this application as relevant to any embodiment of the invention.

For various example embodiments of the invention, the following is also applicable: a method comprising facilitating access to at least one interface configured to allow access to at least one service, the at least one service configured to perform any one or any combination of network or service provider methods (or processes) disclosed in this application.

For various example embodiments of the invention, the following is also applicable: a method comprising facilitating creating and/or facilitating modifying (1) at least one device user interface element and/or (2) at least one device user interface functionality, the (1) at least one device user interface element and/or (2) at least one device user interface functionality based, at least in part, on data and/or information resulting from one or any combination of methods or processes disclosed in this application as relevant to any embodiment of the invention, and/or at least one signal resulting from one or any combination of methods (or processes) disclosed in this application as relevant to any embodiment of the invention.

For various example embodiments of the invention, the following is also applicable: a method comprising creating and/or modifying (1) at least one device user interface element and/or (2) at least one device user interface functionality, the (1) at least one device user interface element and/or (2) at least one device user interface functionality based at least in part on data and/or information resulting from one or any combination of methods (or processes) disclosed in this application as relevant to any embodiment of the invention, and/or at least one signal resulting from one or any combination of methods (or processes) disclosed in this application as relevant to any embodiment of the invention.

In various example embodiments, the methods (or processes) can be accomplished on the service provider side or on the mobile device side or in any shared way between service provider and mobile device with actions being performed on both sides.

For various example embodiments, the following is applicable: An apparatus comprising means for performing a method of the claims.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIGS. 4A and 4B are diagrams illustrating examples of challenges encountered with respect to road feature learning, according to one embodiment;

DESCRIPTION OF SOME EMBODIMENTS

Examples of a method, apparatus, and computer program for determining a negative observation of a road feature are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention. Although various embodiments are described with respect to determining negative observations of traffic or road signs as examples of road features, it contemplated that the embodiments are also applicable to any other type of road feature or furniture (e.g., physical dividers, curbs, etc.) that are observable or detectable from a roadway.

Figure 1:
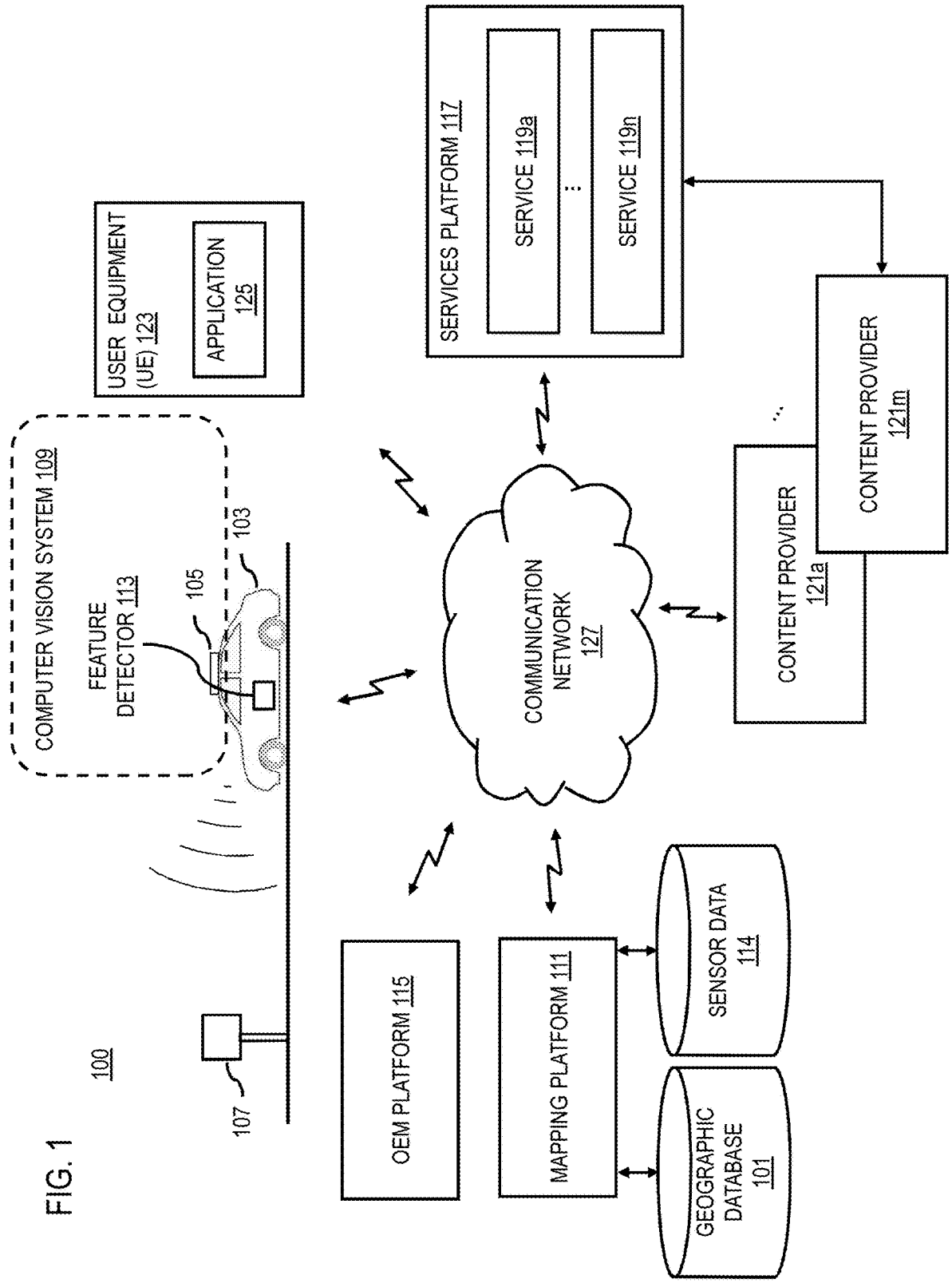
FIG. 1 is a diagram of a system capable of road feature learning and determining negative observations of road features, according to one embodiment.

FIG. 1 is a diagram of a system capable of road feature learning and propagating learned traffic sign data, according to one embodiment. A digital map (e.g., such as that provided by a geographic database 101), as a source of road attribute data (e.g., speed limits, hazard warnings, road conditions, etc.) can play a crucial role in enabling automated driving use-cases. When used for such use-cases, service providers generally target a goal that their digital map should approach 100% or near 100% accuracy in real-time to ensure safe autonomous driving. In one embodiment, a system 100 of FIG. 1 can move towards achieving 100% accuracy in real time via ingestion of smart vehicle sensor data and analysis, as well as coding and distribution of relevant information derived from the sensor data and conflated with other sources. Thus, in one embodiment, when using data from vehicle-based sensors, the system 100 can update the digital map data of the geographic database 101 at higher frequencies (e.g., every few hours) than traditional processes. Since there can be potentially thousands of such cars or vehicles (e.g., a vehicle 103) traveling in road network and reporting sensor data, the system 100 can provide, in some embodiments, updated digital map data (e.g., including learned traffic sign data or data learned about any other road feature/furniture) in near real time.

In other words, the automotive industry is focused on delivering safer, more comfortable and more efficient mobility solutions. The path towards these objectives include, for instance, automation of many functions currently performed by drivers as a way to reduce the burden asked of drivers in today's busy and highly regulated road environment, while improving reaction times and decision making. In one embodiment, digital maps provide information complementary to on-board sensors and driver cognition to enhance the assistance functions implemented in a vehicle 103. For example, the geographic database 101 can be a source of road attributes or other characteristics (e.g., speed limits, hazard warnings, road conditions, etc.) that would traditionally be conveyed to drivers via road signs. Therefore, the geographic database 101 can be important for enabling these driving automation use-cases as a source of road attributes or characteristics that can be retrieved automatically by the vehicles 103.

For example, the system 100 of FIG. 1 learn a road feature or traffic sign (e.g., a speed limit sign) and the sign's property (e.g., a speed limit value depicted by a speed limit sign) located in a road network by using multiple observations from different vehicles (e.g., consumer vehicles 103 and/or specialized mapping vehicles). In one embodiment, traffic sign recognition (TSR) observations or observations of any other road feature (e.g. sensor data reports) from multiple consumer vehicles 103 are map matched to road link records of the geographic database 101 and spatially clustered according to detected sign and/or feature properties. For example, TSR observations that are close in space (e.g., within a threshold distance of each other) and have the same or similar properties are aggregated into a cluster. In one embodiment, a learned sign's or a learned road feature's property or characteristic (e.g., a road attribute value indicated by the learned sign such as a speed limit value) can then be determined based on the property of the observations in a cluster (e.g., a consensus property, unanimous property, etc. of the cluster). This learned road attribute value (e.g., speed limit value) can be associated with one or more road links corresponding to or near the location of the learned sign.

Figure 2:
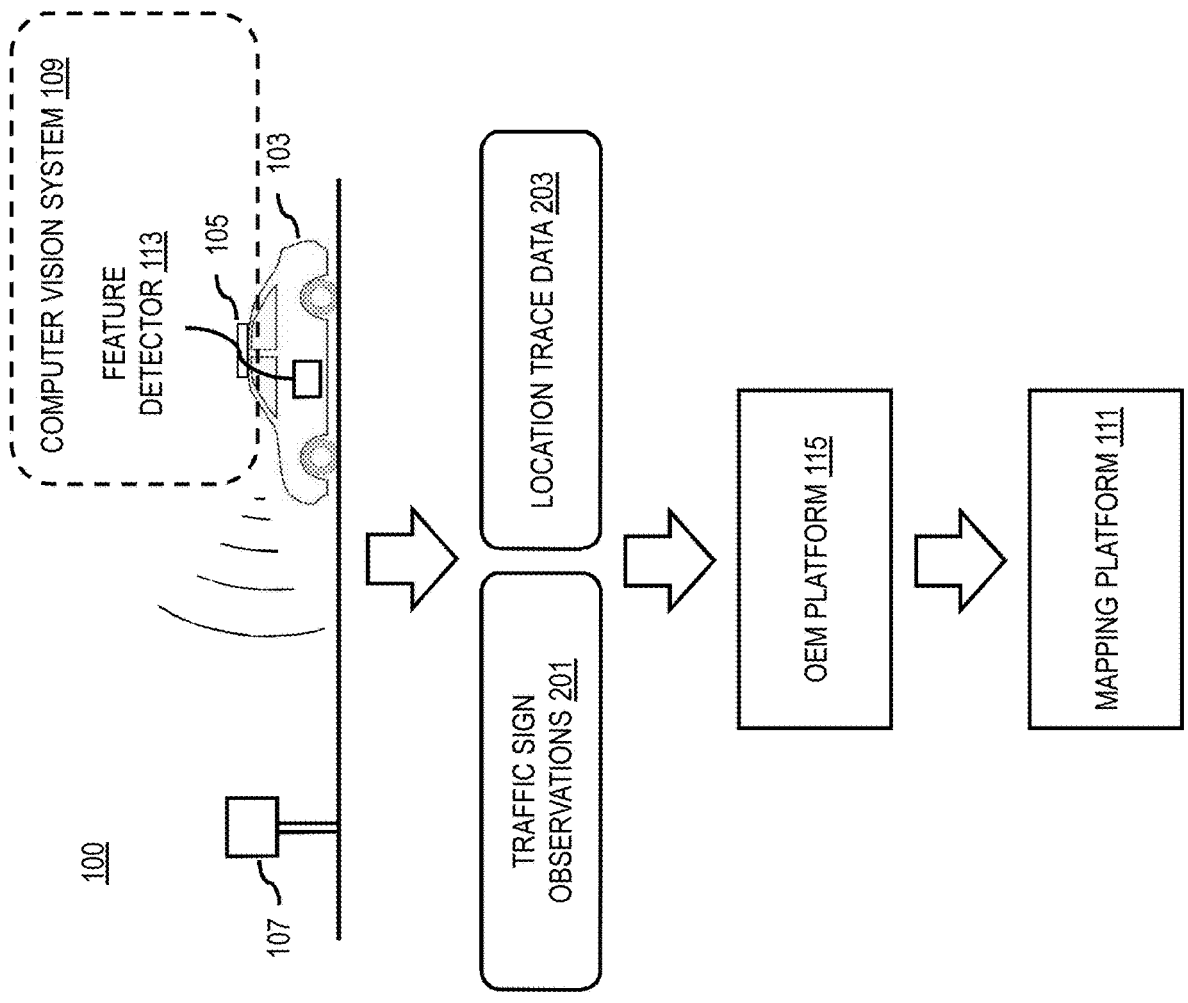
FIG. 2 is a diagram illustrating an example of reporting road feature observations from a vehicle, according to one embodiment.

In one embodiment, as shown in FIG. 2, the vehicles 103 that contribute TSR observations 201 to the system 100 have their own respective computer vision systems 109 that are generally configured to report a traffic sign (e.g., a speed limit sign) or other road feature when it observes one. These computer vision systems 109 can be any type of sign detection system known in the art or equivalent, for instance, comprising individual image recognition software or feature detectors 113 (e.g., machine learning or pattern matching models) and sensors 105 (e.g., optical sensors, radar sensors, LiDAR sensors, location sensors, etc.) that can detect and recognize road or traffic signs and their attributes observed within the field of the vision of the sensors 105.

The problem, however, is that the vehicles 103 generally transmit TSR observations 201 only for the signs or road features that are detected by the vehicles 103, and do not explicitly transmit reports that they did not see a sign or road feature. In one embodiment, reports of not detecting a sign or road feature are referred to as a negative observation reports. In certain scenarios, negative observation data can be useful. For example, the system 100 may receive 10 TSR observations of a sign (i.e., positive observations) over a 24-hour period and determine that the sign is present. However, if negative observation data were available to show that over the same 24-hour period, 1,000 negative observations of the same sign at the location as the 10 positive observations, the system 100 may determine that the reported sign may not be present because there are many more negative observations than positive observations. In other words, in one embodiment, negative observations can be used (e.g., as a post processing step following traffic sign learning) to validate whether a learned or observed traffic sign is present or removed (e.g. due to road construction ends) in a road network. Therefore, service providers face significant technical challenges to obtaining data on negative observations when these observations are not explicitly reported.

To address these challenges, the system 100 introduces a capability to consider vehicle location traces (e.g., sequences of location points, e.g., latitude, longitude, heading, timestamp, etc.) for confirming if a trace passes a given traffic sign or road feature without producing an observation (e.g., TSR observation) that matches the traffic sign or road feature. In one embodiment, since the system 100 may receive many vehicle location traces (e.g., from various vehicle manufacturers or Original Equipment Manufacturer (OEM) platforms 115), the system 100 can store the received location trace data into a spatial data structure that supports spatial queries. In this way, the system 100 can perform a spatial query of the spatial data structure with location trace data within a spatial radius of a sign or feature of interest. The system 100 can the process just the resulting location trace data to determine whether the trace passes the sign or feature of interest without reporting a matching observation. If the system 100 confirms that the trace passes without reporting a matching observation, the trace can be a negative observation of that sign or road feature.

In one embodiment, as shown in FIG. 2, the location trace data can be collected as part of the TSR observation or other sensor data collection process. For example, the vehicles 103 that contribute TSR observations 201 and/or location trace data 203 to the system 100 have their own respective computer vision systems 109. These computer vision systems 109 can be any type of sign/feature detection system known in the art or equivalent, for instance, comprising individual image recognition software or feature detectors 113 (e.g., machine learning or pattern matching models) and sensors 105 (e.g., optical sensors, radar sensors, LiDAR sensors, location sensors, etc.) that can detect and recognize road or traffic signs or features and their attributes observed within the field of the vision of the sensors 105, and record location trace data 203 (e.g., via location sensors such as Global Positioning System (GPS) sensors or equivalent).

In one embodiment, location trace data 203 includes location points (e.g., GPS points) and location traces (GPS traces). A location or GPS point (e.g., $p_i$) represents location data submitted from a location sensor (e.g., GPS sensor) of the vehicle 103, and can consist of data fields including but not limited to: latitude, longitude, heading, and timestamp. A location trace (e.g., GPS trace) T is a sequence of location points (e.g., $T=p_0 \rightarrow p_1 \rightarrow \ldots \rightarrow p_k$), where the timestamps in the sequence strictly increase. The location trace can also be referred to as a path or trajectory. The location trace data 203 can be reported for all trips performed by the vehicle 103 regardless of whether a TSR observation 201 is made. The TSR observations 201 can then be reported from the vehicles 103 for a recognized sign 107 separately and can include, but are not limited, to any of the following data fields: a sign value, sign type, latitude, longitude, heading, and/or side of road the sign was detected.

In one embodiment, TSR observations 201 and location trace data 203 can be transmitted from the consumer vehicles 103 to the mapping platform 111 through an OEM platform 115 or directly from the consumer vehicles 103 to the mapping platform 111. The OEM platform 115 can be operated by a vehicle manufacturer and can aggregate TSR observations 201, location trace data 203, and/or related sensor data collected from the vehicles 103 that are produced by the manufacturer. The OEM platform 115 can pre-process (e.g., anonymize, normalize, etc.) the TSR observations 201 and/or location trace data 203 before transmitting the processed TSR observations 201 and/or location trace data 203 to the mapping platform 111 (e.g., operated by a map service provider). Although FIG. 2 depicts an example with one OEM platform 115, the mapping platform 111 can have connectivity to multiple OEM platforms 115 (e.g., each corresponding to a different vehicle manufacturer) to collect TSR observations 201 and/or location trace data 203.

In one embodiment, given TSR observations 201 from multiple vehicles 103 (or multiple OEM platforms 115) in a sensor chain (e.g., stored in sensor database 114), the system 100 can cluster the TSR observations 201 according to location and one or more detected sign properties (e.g., a sign value, sign type, etc.) to learn a newly placed sign in near-real-time (e.g., within hours or better of sensor data collection). A newly placed sign is determined based on current clusters and a comparison to an earlier map such as a map of signs from the day before. For example, if the comparison indicates that a learned sign was not present in the earlier map, the system 100 can designate that learned sign as a newly placed sign. The system 100 then identifies the road link to which the learned sign or sign property or value applies (e.g., via map matching), and updates the road link record of the geographic database 101 corresponding to the identified road link accordingly. In one embodiment, the learned sign data of the geographic database 101 can then be used for as the candidate signs to be evaluated for negative observations based on the location trace data 103 aggregated into a spatial data structure according to the embodiments described herein.

Figure 3:
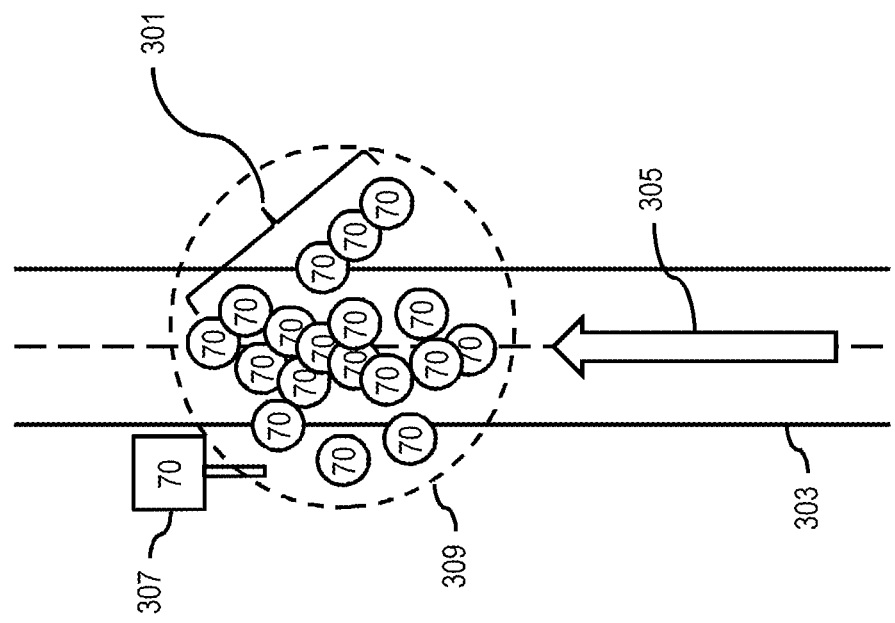
FIG. 3 is diagram illustrating a clustering of road feature observations, according to one embodiment.

An example of this clustering process for traffic sign learning (or feature learning in general) is illustrated in FIG. 3. In the example of FIG. 3, multiple TSR observations 301 are received from vehicles 103 (not shown) traveling on the road segment 303. The road segment 303 has a heading indicated by the arrow 305 and has a speed limit sign 307 with a posted speed limit of 70 mph (e.g., the sign 307's value) located on the left side of the road segment 303. Each of the TSR observations 301 are generated based on sensor data from a computer vision system 109 of each reporting vehicle 103. As each respective reporting vehicle 103 approaches the speed limit sign 307, the sign is detected, and its properties are detected as reported as a respective TSR observation 301. For example, each of the TSR observation can identify the sign type (e.g., a speed limit sign), the sign's value (e.g., 70 mph), location of either the reporting vehicle 103 or detected sign, heading of the vehicle 103 or road segment 303, the side of the road 303 where the sign was detected). The mapping platform 111 of the system 100 can collect the TSR observations 301 (e.g., over a predetermined period of time such as 24 hours) for spatial clustering into a cluster 309. The mapping platform 111 identifies a learned sign and sign properties from the cluster 309 (e.g., a learned speed limit sign with a learned sign value 70 mph). The mapping platform 111 can then determine the road link record or records of the geographic database 101 corresponding to the road segment 303 and update the attributes of the determined road link records to indicate the learned sign and any of the learned sign values.

Figure 4A:
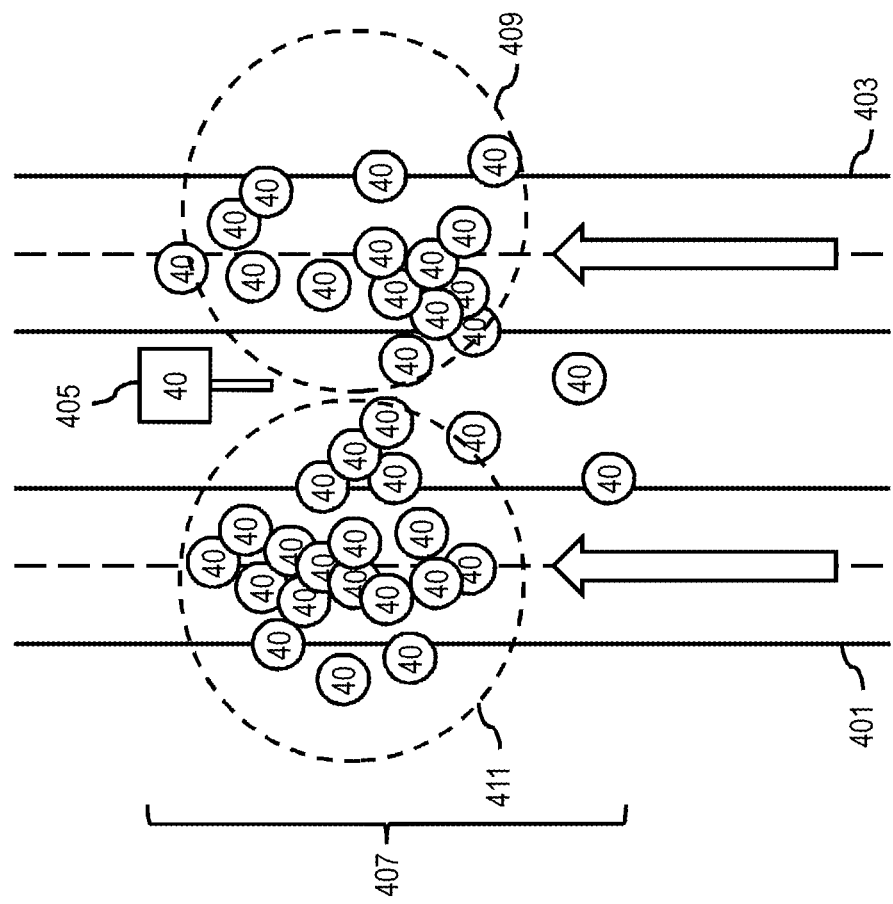

Under some scenarios, learning traffic signs or road features and matching them correctly to road links of the geographic database 101 can present additional technical challenges and problems. These challenges can arise from map topology (e.g., in the vicinity of ramps, parallel roads, complex intersections, etc.), sign characteristics (e.g., variable speed signs, signs that are not speed signs but are misclassified as speed signs, etc.), and/or other similar conditions. For example, FIG. 4A illustrates a scenario in which the map topology includes a main road segment 401 next to a side road segment 403 that run in parallel with the same heading. As shown, there is a speed limit sign 405 located between the main road segment 401 and the side road segment 403. Vehicles 103 traveling on both roads 401 and 403 can observe and detect the speed limit sign 405. As a result, TSR observations 407 of the sign 405 are located on both the main road segment 401 and the side road segment 403 because the computer vision systems 109 typically report the location of corresponding vehicles when the sign 405 was observed and not the location of the sign 405. As a result, there are two spatial clusters of TSR observations 407: (1) a cluster 409 on the side road segment 403 of TSR observations 407 with reported sign values of 40 mph, and (2) a cluster 411 on the main road segment 401 of TSR observations 407 with reported sign values of 40 mph. However, in this example, the sign 405 is only applicable to the side road segment 403. This multiple cluster problem can also happen in the vicinity of ramps or map road topologies where the system 100 may aggregate several clusters because a given sign is seen by vehicles 103 that are driving on roads where the observed sign is not applicable.

In another scenario, as shown in FIG. 4B, reporting vehicles 103 can potentially misclassify and report a TSR observation that is not related to an actual road or traffic sign/feature. As shown in the example of FIG. 4B, a reporting consumer vehicle 103 drives on a road segment 421. The computer vision system of the vehicle 103 misclassifies an image of a numerical marking 425 (e.g., an identification number "100") on the lower left of a parked truck 423 as a traffic speed limit sign with a speed limit value of 100 mph. As a result of this misclassification, the vehicle 103 generates a TSR observation 427 to report that it has detected a speed limit sign with a sign value of 100 mph, and transmit the TSR observation 427 in the sensor chain of the system 100.

Figure 5:
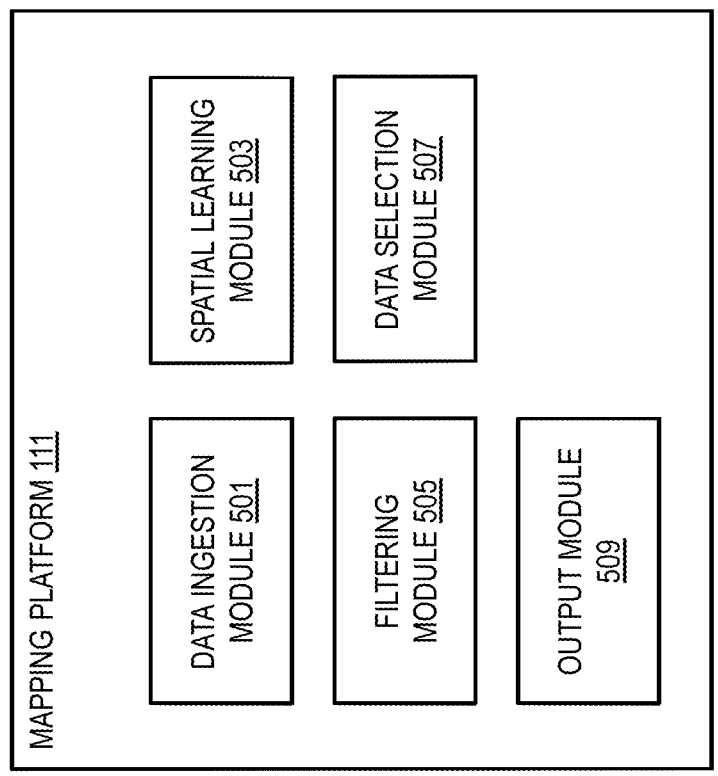
FIG. 5 is a diagram of the components of a mapping platform capable of road feature learning, according to one embodiment.

In one embodiment, as noted above, the mapping platform 111 can perform one or more functions related to determining negative observations of a road feature and/or traffic sign/feature learning according to the embodiments described herein. FIG. 5 is a diagram of the components of the mapping platform 111, according to one embodiment. By way of example, the mapping platform 111 may include one or more components for traffic sign learning. In one embodiment, the mapping platform 111 includes a data ingestion module 501, spatial learning module 503, filtering module 505, data selection module 507, and output module 509. It is contemplated that the functions of these components may be combined in one or more components or performed by other components with similar functionalities (e.g., the OEM platform 115, a services platform 117, any of the services 119a-119n of the services platform 117, etc.). The above presented modules and components of the mapping platform 111 can be implemented in hardware, firmware, software, or a combination thereof. Though depicted as a separate entity in FIG. 1, it is contemplated that the mapping platform 111 may be implemented as a module of any of the components of the system 100. In another embodiment, one or more of the modules 501-509 may be implemented as a cloud-based service, local service, native application, or combination thereof.

The functions of the mapping platform 111 and modules 501-509 with respect to determining a negative observation of a traffic sign or road feature are discussed with respect to the FIGS. 6-9 below. In one embodiment, the embodiments related to determining negative observations can be performed as a standalone process or as a post processing step of a general traffic sign or road feature learning process such as the embodiments described with respect to FIGS. 10-14 below. It is noted that the general traffic sign or feature learning process described with respect to FIGS. 10-14 is provided by way of illustration and not as limitations. Accordingly, it is contemplated that embodiments of propagating traffic sign data or road feature data in a road network can be performed in combination with any equivalent process for determining learned signs/features and/or learned sign/feature values used to label road links.

Figure 6:
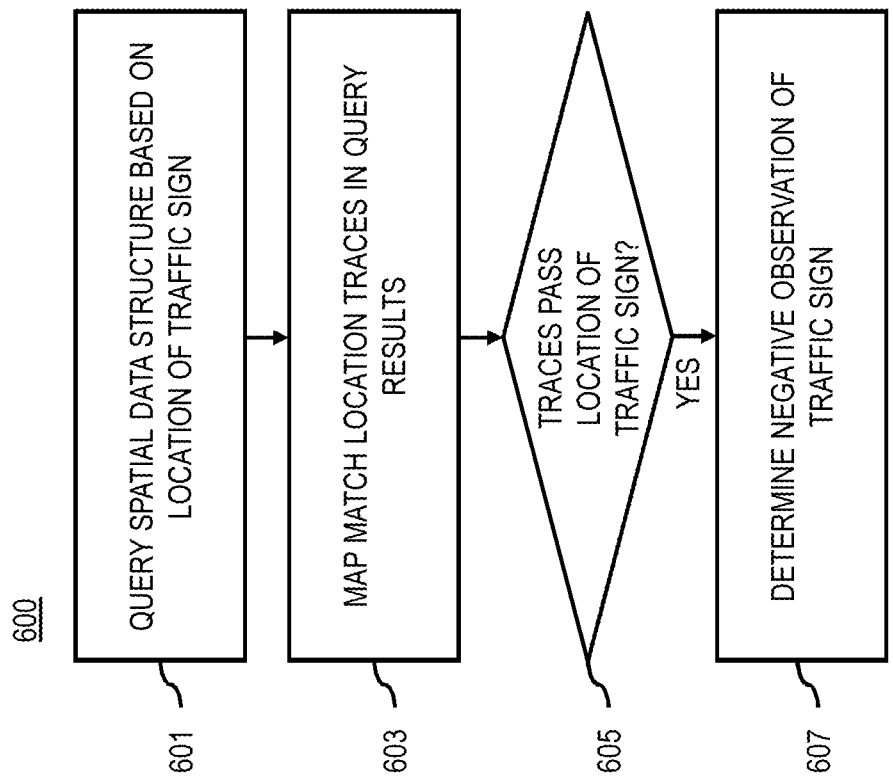
FIG. 6 is a flowchart of a process for determining negative observations of road features, according to one embodiment.
Figure 17:
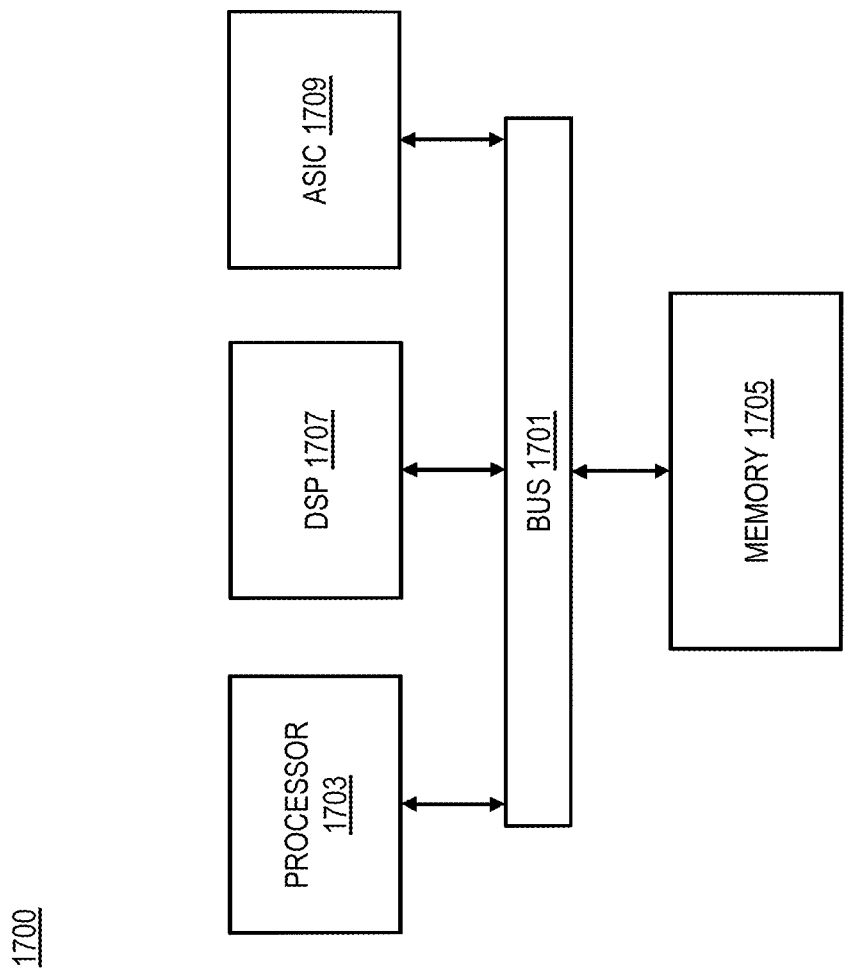
FIG. 17 is a diagram of a chip set that can be used to implement an embodiment.

FIG. 6 is a flowchart of a process for determining negative observations of road features, according to one embodiment. In one embodiment, the mapping platform 111 and/or any of its modules 501-509 may be implemented in, for instance, a chip set including a processor and a memory as shown in FIG. 17 to perform the process 600. As such, the mapping platform 111 and/or the modules 501-509 can provide means for accomplishing various parts of the process 600. In addition or alternatively, the OEM platform 115, services platform 117, and/or one or more of the services 119a-119n (also collectively referred to as services 119) may perform any combination of the steps of the process 600 in combination with the mapping platform 111, or as standalone components. Although the process 600 is illustrated and described as a sequence of steps, it is contemplated that various embodiments of the process 600 may be performed in any order or combination and need not include all of the illustrated steps.

In one embodiment, the process 600 for determining negative observations of traffic signs or road features begins by processing the traffic sign data (e.g., such as traffic sign data learned TSR observations 201) and location trace data 203 (e.g., received as described with respect to FIG. 2). More specifically, in one embodiment, the mapping platform 111 map matches the traffic signs (e.g., speed limit signs) or road features for which negative observations are to be determined. The mapping platform 111 can use, for instance, any point-based map matcher or equivalent to correlate the locations of the signs to corresponding road links of the digital map of the geographic database 101. The mapping platform 111 can use attributes such as location and heading of the signs to perform the map matching. The output of the map matching for each sign or feature can be the matched road link (e.g., also referred to as a matched sign road link) and the offset along the link (e.g., percent from a reference end of the matched link to map-matched location of the sign; and also referred to as the matched sign link offset). The set of road links against which the signs or features are matched, for instance, can include all or a portion of the road links stored in the geographic database 101. In one embodiment, the same set of links used for map matching of the signs or features during this phase can be used for map matching that occurs in other portions of the process 600.

In one embodiment, the mapping platform 111 can also prepare the location trace data 203 to be used for determining negative observations of traffic signs or road features by creating a spatial data structure of the location trace database 103 to advantageously improve location trace search speeds. The mapping platform 11 can first process the location trace data 203 to retrieve only the location points and/or traces that did not have an associated sign/feature observation. In other words, the mapping platform 111 retrieves a plurality of location points from a plurality of location traces collected from sensors 105 of vehicles 103 traveling in a road network that did not have traffic sign or road feature observations reported by the vehicles 103. This data can be retrieved, for instance, by filtering the location trace data 203 against the TSR observations 201.

The mapping platform 111 can then load all the location points (e.g., $p_0 \rightarrow p_1 \rightarrow \rightarrow \ldots \rightarrow p_k$) from the traces that did not have a sign observation in a spatial data structure that indexes the location points according to location. The spatial data structure, for instance, can be any hierarchical tree-based such as, but not limited to, an R-Tree, Quad-Tree, or equivalent. In one embodiment, the creation of the spatial structure can be done once for each map update cycle, and need not be done for each sign. In addition, the spatial data structure should facilitate the order of 0 (log N) search time where N is the total number of points in the spatial data structure. In one embodiment, the mapping platform 111 can use every location point of the received location trace data 203. However, the mapping platform 111 can downsample the plurality of location traces in the spatial data structure by storing a subset of the plurality of location traces based on an available memory capacity for storing the spatial data structure or when a reduced memory footprint is desired. In one example downsampling scheme, the mapping platform 111 can store every other location point from the trace (e.g., $p_0 \rightarrow p_2 \rightarrow \ldots \rightarrow p_k$) as opposed to storing every location point. It is noted that this downsampling scheme is provided by way of example and not as a limitation. Accordingly, it is contemplated that the mapping platform 111 can use any process or mechanism to reduce the memory footprint of the spatial data structure. In one embodiment, the spatial data structure can be stored in the geographic database 101 or another equivalent database.

After preparing the traffic sign or road feature data (e.g., learned from the TSR observations 201) and the location trace data 203 according to the embodiment above, the mapping platform 111 can query the spatial data structure for a set of location points based on a spatial radius around a location of a traffic sign (e.g., each traffic sign learned from the TSR observations 201) or other road feature (step 601). In other words, for each traffic sign or feature (e.g., speed limit sign), the mapping platform 111 can use the location of the traffic sign or feature to perform a spatial radius search/query on the spatial data structure using a search radius (e.g., a few hundred meters such as 200 m). In one embodiment, the spatial search radius is configurable. For example, there is a tradeoff with this search, the larger the spatial search radius then the longer the search time. On the other hand, a smaller search radius may not return all the location points that may be relevant to computing negative observations for the sign or feature.

In step 603, for each location trace in the set of location points, the mapping platform 111 can map match each location trace to a matched path of road links. For example, the mapping platform 111 can map match the location points in each location trace resulting from the spatial query using any path-based map matcher known in the art. In one embodiment, only location points from the same vehicle can form a trace. Therefore, to construct a location trace from the queried results, the mapping platform 111 can identify location points originating from the same vehicle and then arrange the location points by timestamp. In one embodiment, the path-based map matching of the queried location points can use the same link set as used for map matching the traffic signs of interest. In this way, the location traces will be mapped matched to same set of links as the traffic signs or other road features in the TSR observations 201 to facilitate comparison. The output of the path-based map matcher can be all links that the vehicle traversed and also the offsets (e.g. percent from reference end) of the links that contains a location point from the map-matched location trace. Accordingly, in one embodiment, each map-matched location point output can include a matched link (e.g., also referred to as a matched point road link) and an offset (e.g., also referred to as a matched point offset). In one embodiment, a point-based map matcher can also be used to map match the queried location traces, but the point-based map matching may have less accuracy and/or introduce error when determining the actual vehicle particularly over short links.

In step 605, the mapping platform 111 can use reported TSR observations 201 and/or learned traffic sign locations to determine if any vehicle "passed by" a traffic sign or road feature of interest without detecting the sign and reporting it. Effectively, the mapping platform 111 checks for cases where the location trace passed by the location of the traffic sign and did not observe the sign. In one embodiment, the mapping platform 111 can search the queried and map matched location traces for specific cases where the same location trace contains at least two locations points that confirms that the vehicle passed by the traffic sign. In other words, the mapping platform 111 can determine whether the location of the traffic sign falls between two map-matched location points of each location trace that are on a map matched path of road links.

Figure 7:
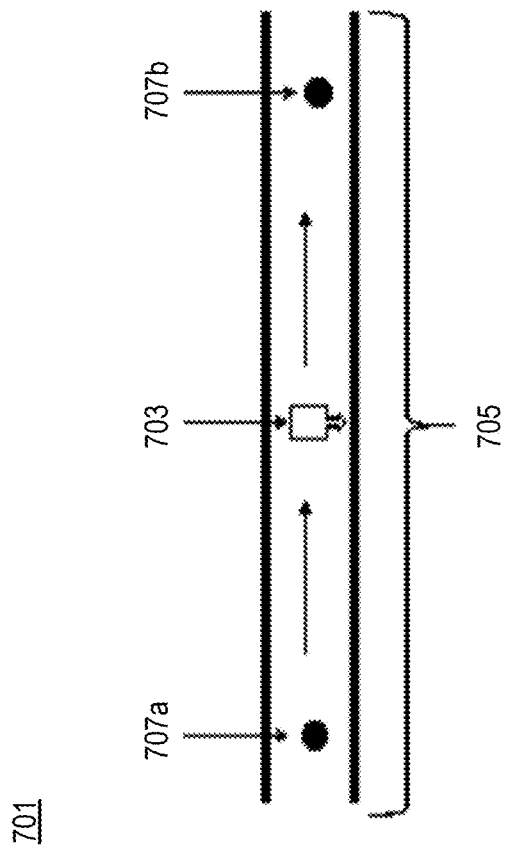
FIGS. 7-9 are diagrams illustrating example cases for evaluating that a location trace indicates that vehicle passes a traffic sign, according to one embodiment.
Figure 8:
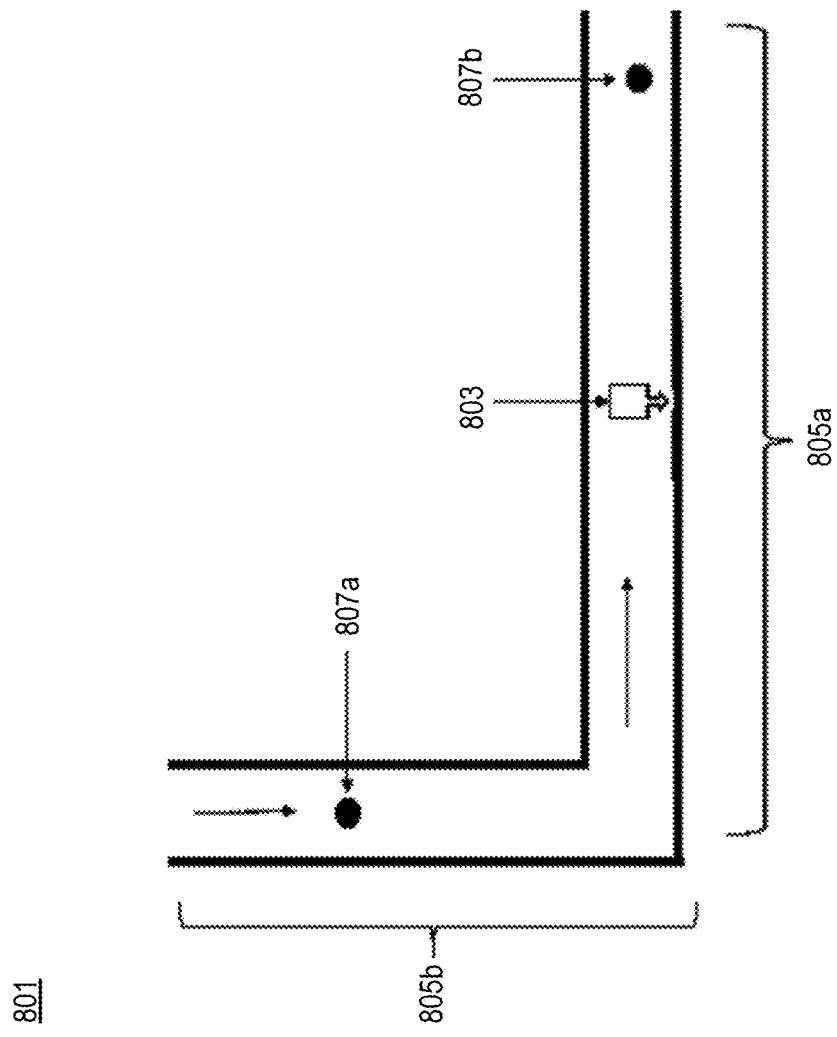
Figure 9:
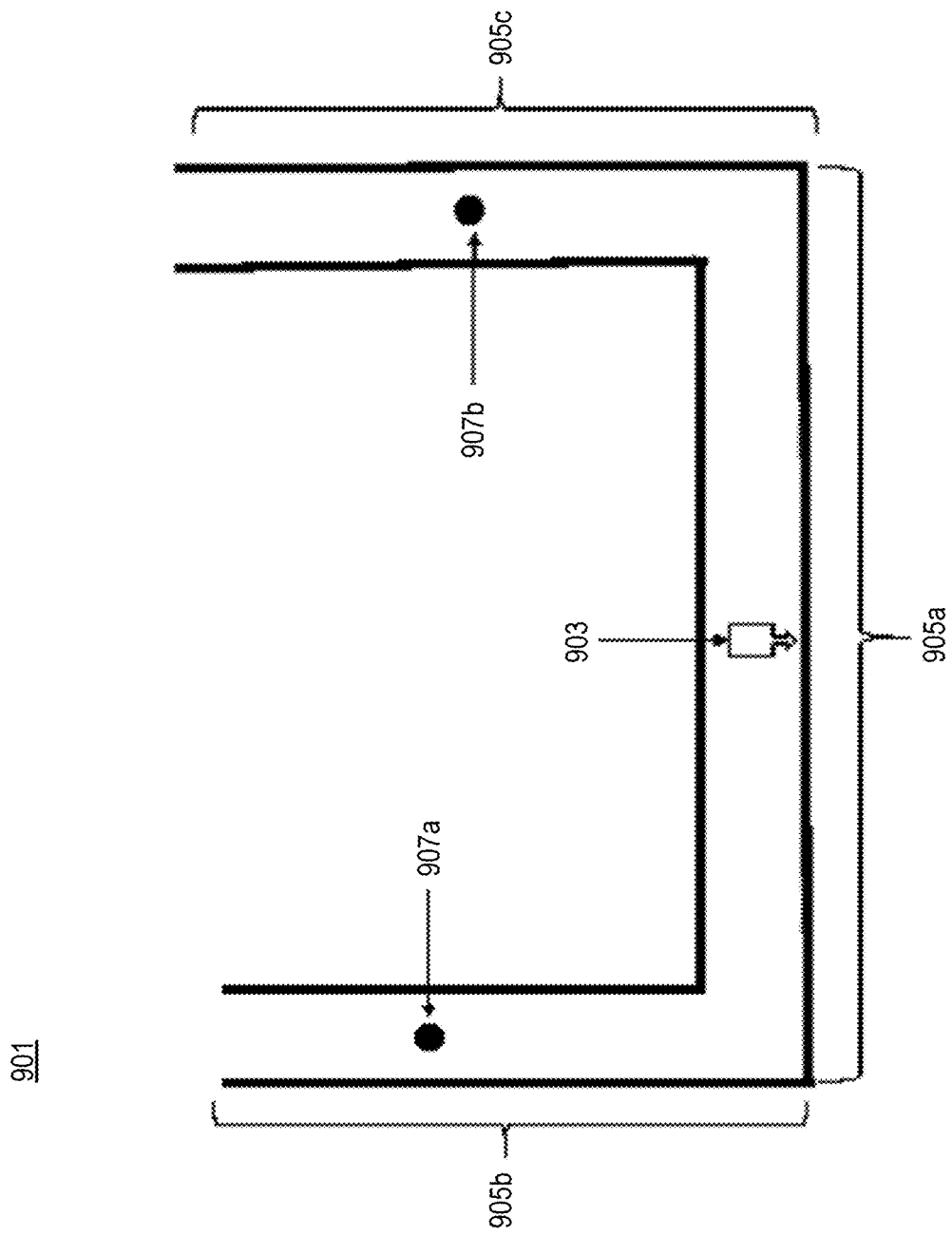

FIGS. 7-9 are diagrams illustrating three example cases for evaluating that a location trace indicates that vehicle passes a traffic sign, according to one embodiment. As shown in example 701 of FIG. 1, one case has the traffic sign 703 located on the same road link 705 as two map-matched location points 707a and 707b of a location trace with the direction of travel from location point 707a to location point 707b, so that the two location points 707a and 707b bracket the traffic sign 703. In this case, the mapping platform 111 can check if the traffic sign 703's offset (e.g., distance from the reference node of the link 705) is between the offsets of the two location points 707a and 707b. In other words, the mapping platform 111 can determine that the location of the traffic sign 703 falls between the two map-matched location points 707a and 707b based on determining that the matched sign link offset is between the matched point offsets of the two map-matched location points 707a and 707b. The offset value, for instance, is the output of map matching that identifies a link to which a sign is map matched and an offset from a reference node of the link that represents the distance from the reference node to the map matched sign's location on the matched link.

Another case is shown in the example 801 of FIG. 8. In this example, a traffic sign 803 is located on a first link 805a, a first map-matched location point 807a is located on a second link 805b, and the second map matched location point 807b is located on the same link 805a as the traffic sign 803 with a direction of travel from location point 807a to location point 807b. Accordingly, the two map-matched location points 807a and 807b from the same location trace bracket the traffic sign 803 but only one of the locations points (e.g., location point 807b) is on the traffic sign 803's link 805a. In this case, the mapping platform 111 can check if there is at least one location point of the trace (e.g., location point 807b) on the traffic sign 803's link. As shown in this case, if the offset of the location point (e.g., location point 807b) that is on the same link 805a as the traffic sign 803 occurs after the offset of the traffic sign 803, then the mapping platform 111 will find corresponding location point of the trace (e.g., location point 807a) on a link (e.g., link 805b) that precedes the traffic sign 803's link 805a (e.g., precedes with respect to the direction of travel). Alternatively, if the offset of the map-matched location point that is on the same link 805a occurs before the offset of the traffic sign 803, the mapping platform 111 can find the corresponding location point that brackets the traffic sign 803 on a subsequent link. In other words, when the map-matched sign location and a first point of the two map-matched location points are on a same road link, and a second point of the two map-matched location points are on a different road link, the mapping platform 111 identifies the different road link as a preceding link of same road link based on determining that matched point offset of the first point occurs after the map-matched sign location on the same road link; or identifies the different road link as a subsequent link of the same road link based on determining the matched point offset of the first point occurs before the map-matched sign location on the same road link.

FIG. 9 illustrates an example 901 of a third case in which each of a traffic sign 903 and the two map-matched locations points 907a and 907b that bracket the traffic sign 903 are all on different links (e.g., links 905a, 905b, and 905c respectively). In this case, the path-based map matching of the location trace including the location points 907a and 907b should have returned that the link 905a on which the traffic sign 903 is located as part of the matched path of road links corresponding to the trace. Accordingly, the mapping platform 111 can find the locations points 907a and 907b respectively on a preceding link 905b and subsequent link 905c of the link 905a with respect to a direction of travel. In other words, when the map-matched sign location and the two map-matched location points are on different road links, the mapping platform 111 identifies the first point of the two map-matched point on a preceding link of the matched sign road link, and identifies the second point of the two map-matched point on a subsequent link of the matched sign road link.

Based on determining that the location trace of interest passes by the traffic sign, the mapping platform can then determine that the location is trace is a negative observation of the traffic sign (step 607). In one embodiment, the determination can result in, for instance, an incrementing of a negative observation counter for each location trace that is determined to be a negative observation which can further result in deleting the sign from cache or map. In addition or alternatively, the data record associated with the location trace or any of the location points in the trace can be flagged or otherwise set to indicate that the trace or point is a negative observation.

In one embodiment, the mapping platform 111 can check other attributes of the location trace, location points, and/or traffic sign to confirm that a classification of the location trace as a negative observation of a traffic sign. For example, the mapping platform can ensure that the sign's heading and the trace's heading are within a threshold when the vehicle passed the sign (e.g., a threshold of 10°). In other words, the determination that a location trace is a negative observation of the traffic sign can be further based on determining that a point heading of at least one location point of each location trace and a sign heading of the traffic sign align within a threshold heading range.

As discussed above, the negative observation data generated according to the embodiments described herein can be used in any number of scenarios. In one embodiment, the mapping platform 111 can validate or confirm a presence of the traffic sign based on the negative observation of the traffic sign. For example, the validating can be based on a number of the negative observations of the traffic sign determined for a traffic sign interest. In one use case, the number of negative observations can be used to determine a ratio of positive to negative observations and vice versa. The ratio can then be compared to a threshold value for confirming the presence of the traffic. If the threshold value is not met, the mapping platform 111 can exclude the traffic from publication to end users, thereby advantageously improving the quality and accuracy of its traffic sign data and by extension improving autonomous driving and other applications relying on traffic sign data.

Figure 10:
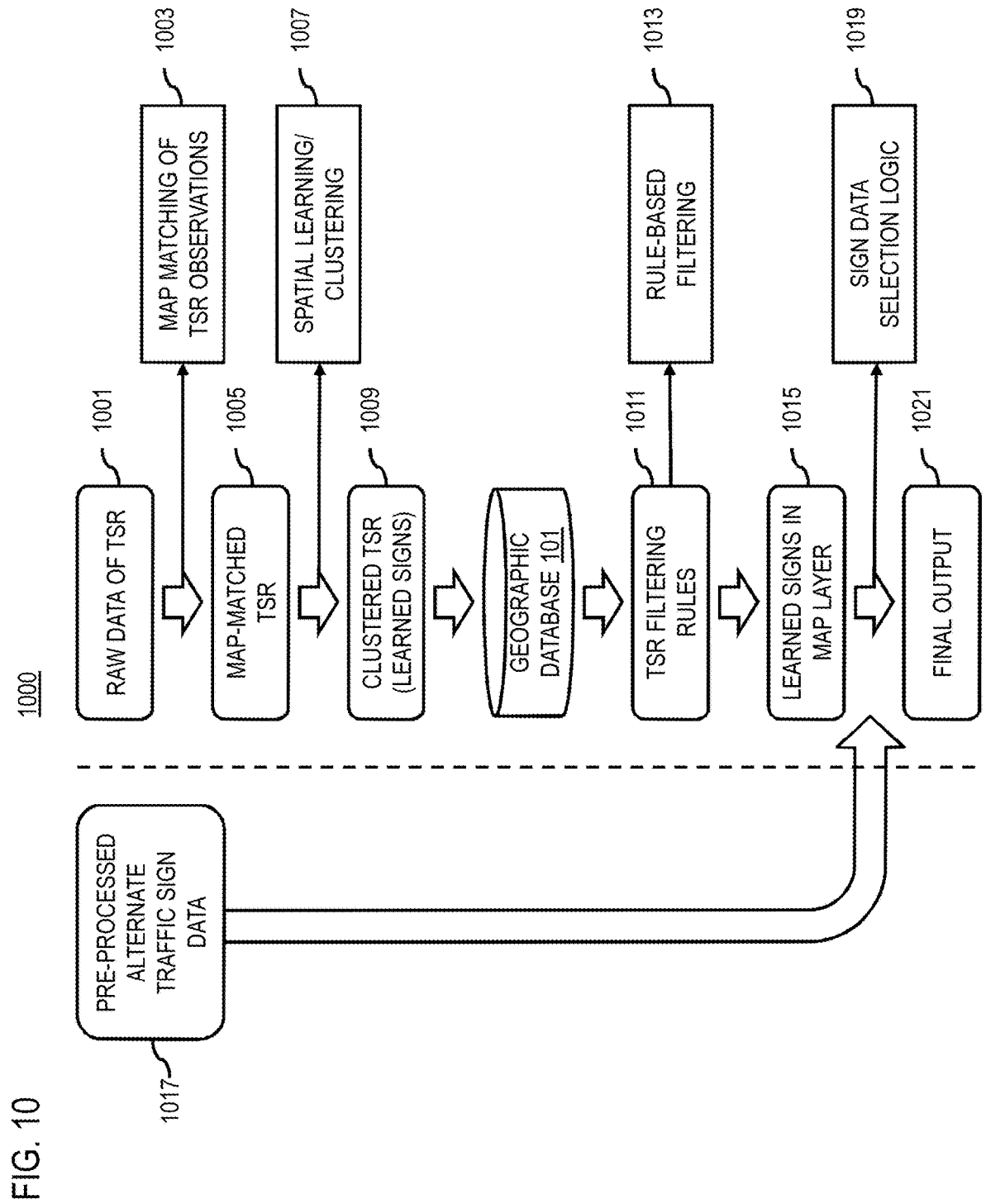
FIG. 10 is a diagram of a general traffic sign learning pipeline, according to one embodiment.

In one embodiment, as noted above, the mapping platform 111 can perform one or more functions related to a general traffic sign learning process in which the embodiments of determining negative observations can be implemented as a post-processing step or as a part of the traffic sign learning itself. FIG. 10 is a diagram of a general traffic sign learning pipeline, according to one embodiment. In one embodiment, the mapping platform 111 and/or any of its modules 501-509 may be implemented in, for instance, a chip set including a processor and a memory as shown in FIG. 17 to perform the process 1000. As such, the mapping platform 111 and/or the modules 501-509 can provide means for accomplishing various parts of the process 1000. In addition or alternatively, the OEM platform 115, services platform 117, and/or one or more of the services 119a-119n (also collectively referred to as services 119) may perform any combination of the steps of the process 1000 in combination with the mapping platform 111, or as standalone components. Although the process 1000 is illustrated and described as a sequence of steps, it is contemplated that various embodiments of the process 800 may be performed in any order or combination and need not include all of the illustrated steps.

As discussed above, one of the technical challenges addressed by the system 100 and the mapping platform 111 is how to learn traffic signs from multiple image recognition observations of traffic signs (e.g., TSR observations) and not of the image recognition or classification technology itself. In other words, the reporting consumer or OEM vehicles 103 have any state of art computer vision system 109 or image recognition software that can be propriety to OEMs. The mapping platform 111 can then use the image recognition results from these computer vision systems 109 to learn new signs and their respective properties to use in various uses cases (e.g., map updates, driver aid, autonomous driving, etc.). Because of the high uncertainty with image recognition, the mapping platform 111 uses multiple TSR observations from different consumer or OEM vehicles 103 to learn a sign.

Accordingly, at process 1001, the data ingestion module 501 collects raw TSR observation data. In one embodiment, vehicles 103 provide raw traffic sign recognition data (e.g., TSR observations) as they drive. The vehicles 103 can provide information such as sign type, sign value, vehicle location (e.g., latitude, longitude, heading, speed, etc.) when it observed the sign, side of road and time stamp. These observations are then sent to the sensor chain (e.g., cloud) through the OEM platform 115 or directly to sensor database 114 of the mapping platform 111 for processing by the data ingestion module 501. In one embodiment, raw TSR observation data for a predetermined period of time (e.g., for at least X hours) is collected or extracted from the sensor chain. For example, the data ingestion module 501 can use X=24, this means the mapping platform 111 processes TSR observations to learn new signs and sign properties every 24 hours.

At process 1003, the data ingestion module 501 map matches the retrieved raw TSR observation data based, for instance, on the digital map data or a road network stored in the geographic database 101. In other words, the map matching process 1003 associates the TSR observations to a road network so that each TSR observation can be link to a particular road link or road segment of the road network. In one embodiment, for map matching, the location data in each TSR observation record (e.g., latitude, longitude, speed, heading, and/or the like of the reporting vehicle 103) are considered. It is contemplated that any map-matching process, means, algorithm, etc. (e.g., path-based map matching) known in the art or equivalent can be used in embodiments of the process 1003 to generate map-matched TSR observation data 1005.

At process 1007, the spatial learning module 503 can then cluster the map-matched TSR observation data 1005 to learn signs and their respective sign properties (e.g., sign value, location, etc.). In one embodiment, the process 1007 comprises the spatial learning stage and any unsupervised learning technique in known in the art can be used to perform the learning. In this stage, the spatial learning module 503 can use a density-based clustering process or equivalent to aggregate similar map-matched TSR observations 1005. By way of example, any density-based clustering algorithm (e.g. DB-SCAN) or equivalent known in the art can be used. To perform the clustering, the spatial learning module 503 can designate default clustering parameters. The clustering parameters can include but are not limited to: a minimum number of TSR observations per cluster, distance threshold for a TSR observation to be included in a cluster, and/or the like. For example, the spatial learning module 503 can require at least three TSR observations that are within a distance threshold of 15 m to create a cluster. In other words, clustering aggregates the TSR observations that are close in space and have the same or similar properties (e.g. sign value, side of the road, etc.). In one embodiment, the output of the process 1007 is a set of clustered TSR data 1009 (e.g., consisting of one or more clusters corresponding respectively to a learned sign) as well as the learned sign's value/other properties and the learned sign's location. In one embodiment, the location is the mean location of TSR observations 1005 that are in a cluster. In addition, similar learned signs or clusters that are within a cluster distance threshold (e.g., within 20 m) and are located on the same road link or adjacent links can be merged.

In one embodiment, the spatial learning module 503 can send the learned sign data (e.g., the clustered TSR data 1009) to the geographic database 101 or equivalent for storage. In one embodiment, the learned sign data can be stored in a separate layer of the geographic database 101 to distinguish the data from other sources of sign data or road attributes that may already be stored in the geographic database 101 (e.g., HD road attribute data) or available from external third-parties (e.g., services platform 117, services 119a-119n, content providers 121a-121m, etc.). In one embodiment, the geographic database 101 or other database where the learned sign data is stored can be queried to determine if a given sign is newly placed on the road.

As discussed above, due to map uncertainties created by road map topology (e.g., ramps, parallel roads, etc.) and other factors such as potential misclassification of non-traffic signs as traffic signs, the filtering module 505 can apply one or more post processing steps (e.g., the embodiments of the network connectivity post processing step described above) to further improve the quality of accuracy of the learned sign data resulting from the processes described above. In one embodiment, the filtering module 505 can use a custom TSR filtering rule set 1011 to perform a rule-based filtering process 1013 to make corrections or otherwise reduce uncertainties in the learned sign data. By way of the example, the filtering rule set 1011 can include rules for correcting the locations of learned signs in for complex road geometries such as near ramps, parallel roads, intersections, or any other locations where a traffic sign can be observed by vehicles 103 traveling on different nearby road links or segments. The filtering rule set 1011 can also provide rules for determining when learned signs or sign values may be potential misclassifications, rules for how to propagate learned sign values or road attributes indicated by the learned sign values to other nearby road links, rules for determining a lateral or longitudinal offset from a location of the cluster to a location of the sign learned from a cluster (e.g., because TSR observations in the clusters usually include the location of the vehicle when a sign is observed and not the location of the sign itself), and/or the like. It is noted that the rules discussed above are provided by way of illustration and not as limitations, and it is contemplated that the filtering module 505 can use any rules or other processes to correct or reduce the uncertainty of learned sign data. After post processing, the filtering module 505 can send the filtered learned signed data 1015 to a separate or production map layer of the geographic database 101 or equivalent.

In one embodiment, the mapping platform 111 can also receive or have access to other sources (e.g., third-party sources) of pre-processed alternate traffic sign data 1017 for one or more areas mapped in the geographic database 101. In other words, the mapping platform 111 could also get pre-processed sign data (e.g., already map matched and clustered) from other near-real-time traffic sign services (e.g., a services platform 117, services 119a-119n, content providers 121a-121m, etc.). In one embodiment, the pre-processed alternate traffic sign data 1017 are sent to a map extension filter layer (e.g., of the geographic database 101) where rules for determining what sign value to use for the specific link can be applied. For example, when multiple data sources of traffic sign data for the same road link are available, the data selection module 507 can use a sign data selection logic process 1019 to apply the data selection rules to select the what sign values to use (e.g., to display for a given link, to drive a vehicle autonomously on a given link, etc.). By way of example, the rules can include, but are not limited to: (1) if a given link does not contains a sign value (e.g., speed limit) learned from TSR observations according to the embodiments described herein, the data selection module 507 can interact with the output module 509 to report the default HD map road attribute (e.g., default speed limit previously stored in the geographic database 101) for that link as the final output 1021; (2) if a given link contains a TSR observation learned sign value (e.g. speed limit), the data selection module 507 instructs the output module 509 to report the TSR observation learned sign value (e.g., a learned speed limit) for that link as the final output 1021; and (3) if another real time traffic sign service (e.g., a services platform 117, services 119a-119n, content provider 121a-121m, etc.) is also sending its traffic sign data to the mapping platform 111, the rules for deciding what sign value (e.g., speed limit) to report for a given will take all three sources into consideration (e.g., based on historical accuracy, data freshness, etc.) to provide the final output 1021.

Figure 11:
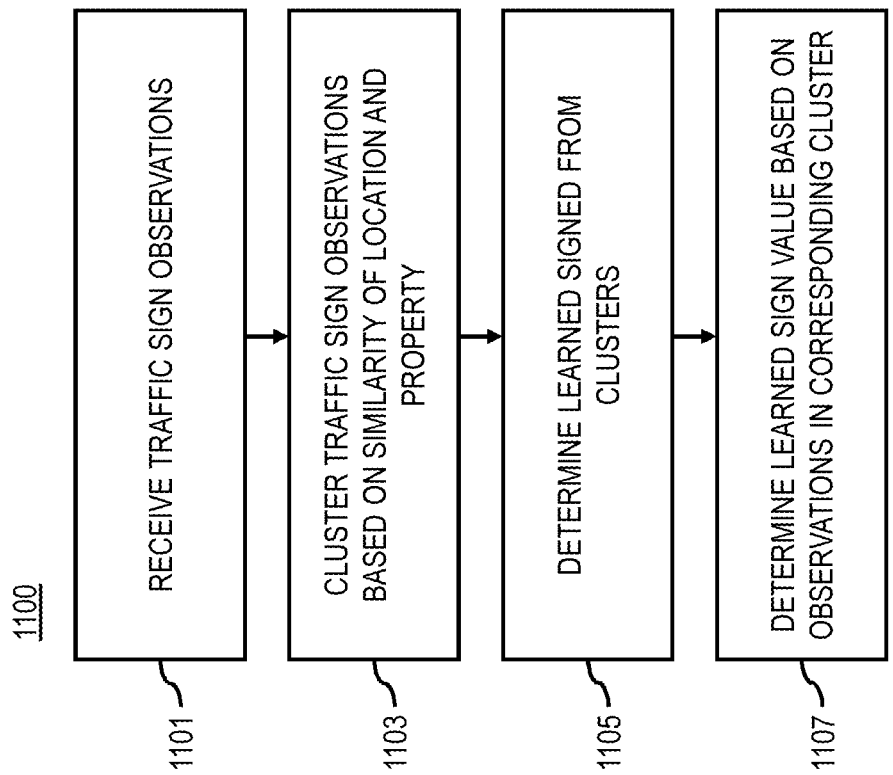
FIG. 11 is a flowchart of a process for clustering traffic sign observations to learn traffic signs and/or traffic sign values, according to one embodiment.

FIG. 11 is a flowchart that provides additional description of the process for clustering traffic sign observations to learn traffic signs and/or traffic sign values, according to one embodiment. In one embodiment, the mapping platform 111 and/or any of its modules 501-509 may perform one or more portions of the process 1100 and may be implemented in, for instance, a chip set including a processor and a memory as shown in FIG. 17. As such, the mapping platform 111 and/or the modules 501-509 can provide means for accomplishing various parts of the process 1100. In addition or alternatively, the OEM platform 115, services platform 117, and/or one or more of the services 119a-119n (also collectively referred to as services 119) may perform any combination of the steps of the process 1100 in combination with the mapping platform 111, or as standalone components. Although the process 1100 is illustrated and described as a sequence of steps, it is contemplated that various embodiments of the process 1100 may be performed in any order or combination and need not include all of the illustrated steps.

In step 1101, the mapping platform 111 receives a plurality of traffic sign observations (e.g., TSR observations) generated using sensor data collected from a plurality of vehicles 103 (e.g., consumer or OEM vehicles). As previously discussed, each of the TSR observations includes data fields such as location data and other sign property data for an observed traffic sign corresponding to each TSR observation. By way of example, the sign property data can include, but is not limited to, a sign value, a sign type, a side of a road on which the observed traffic sign is detected, a time stamp, or a combination thereof.

A sign value refers to a value indicated or displayed on the observed traffic sign. For example, if the traffic sign is a speed limit sign, the sign value would be the speed limit indicated on the speed limit sign. A sign type can be used to indicate different types of traffic signs (e.g., speed limit sign versus parking signs versus stop signs, etc.) as well as different categories of signs within the same sign type. For example, a speed limit sign type can include signs that have explicitly displayed speed limit values (i.e., the speed limit value is presented directly on the sign) or that implies a speed limit value. A sign that implies a speed limit value, for instance, may indicate "End of Highway" to indicate a return to a default speed limit for given area or jurisdiction. Other signs might indicate "School Zone" or "End of School Zone" to indicate when default school zone speed limits should begin or end. In another example, a sign type may also indicate whether a traffic or speed limit has a fixed or variable value. For example, a fixed speed limit sign will always have one speed limit value for all time period, while a variable speed limit can display different speed limits depending on time of day, level of traffic congestion, etc.

The data field for which side of the road that a traffic sign was observed can also be referred to as the lateral offset of the sign with respect to the road. For example, this data field records whether the observed traffic sign was detected on the left side, right side of the road, or other position of the traffic sign with respect to the road (e.g., overhead sign, sign painted onto the road surface, etc.). In addition, each TSR observation includes location data indicating, for instance, a location (e.g., in latitude and longitude), a heading, a speed, or a combination thereof of a reporting vehicle 103 when the observed traffic sign is detected.

In step 1103, the mapping platform 111 clusters the plurality of map matched traffic speed sign observations into at least one cluster based on the location data (e.g. latitude, longitude, map match link identification, etc.) and the sign property data. As previously described, the mapping platform 111 can use any clustering technique (e.g., DBSCAN, k-means, etc.) to spatially cluster TSR observations into one or more clusters based on similarity of location and property. The mapping platform 111, for instance, can group TSR observations that are located within a threshold distance or proximity of each other (e.g., within 15 meters) and whose detected properties (e.g., sign values) are determined to be the same or similar to within a similarity range. In one embodiment, the clustering is initiated after predetermined intervals of TSR observations are collected (e.g., every 24 hours or every X number of hours). In this way, the TSR observations are processed according to time epochs corresponding to the data collection time intervals. In addition or alternatively, the clustering can be triggered based on collecting a minimum number of TSR observations from a given area. For example, after a minimum of 3 or a minimum of Y number of TSR observations for a given road link or segment, the TSR observations can be processed by the mapping platform 111. The output of step 1103 can include one or more clusters of TSR observations from which traffic sign data can be learned.

In step 1105, the mapping platform 111 determines a learned sign for at least one of the clusters generated in step 1103. In addition or alternatively, the mapping platform 111 can determine a learned sign value indicated by the learned sign based the location data, the sign property data, or a combination for the plurality of traffic sign observations aggregated in the cluster of interest (step 1107). In one embodiment, the learning can be performed using any supervised learning technique (e.g., machine learning, statistical pattern matching, etc.) or equivalent. For example, in supervised learning, ground truth data comprising clusters of TSR observations annotated with known traffic signs and their respective properties can be used to train a machine learning model (e.g., neural networks, support vector machines (SVM), decision trees, RandomForest, etc.) to predict or learn traffic signs and sign properties given a feature set constructed of the properties of the clustered TSR observations. The mapping platform 111 can then construct a feature set of properties (e.g., number of observations, location/heading/speed of reporting vehicles 103, detected sign properties, etc.) for a TSR cluster of interest. This constructed cluster feature set can then be used as an input feature set to the trained machine learning model to learn signs and/or sign values/properties from the cluster TSR observations.

In one embodiment, the mapping platform 111 can also determine a confidence value, an accuracy level, or a combination thereof for the learned sign, the learned sign value, or a combination thereof. For example, the supervised learning process described about is generally a probabilistic classification process that can also output a confidence metric indicating a likelihood that a learned sign represents an actual sign in the road network based on the input feature set of the TSR cluster. In one embodiment, accuracy level can be determined by validating at least a subset of the learned sign results through a separate process (e.g., by sending a mapping vehicle or service personnel to the learned sign's location to verify the learned sign and/or its properties). The accuracy level can then be calculated based on the percentage of learned signs that match independent observation of the sign. It is noted that the processes for determining the confidence value and the accuracy level are provided by way of illustration and not as limitations. It is contemplated that the mapping platform 111 can use any equivalent means known in the art to assess the confidence level and/or accuracy level of the learned sign data. In one embodiment, the confidence value and/or accuracy level can be used for selecting between available traffic sign data for a given road link as previously described with respect to FIG. 10 and further described below with respect to FIG. 12.

Figure 12:
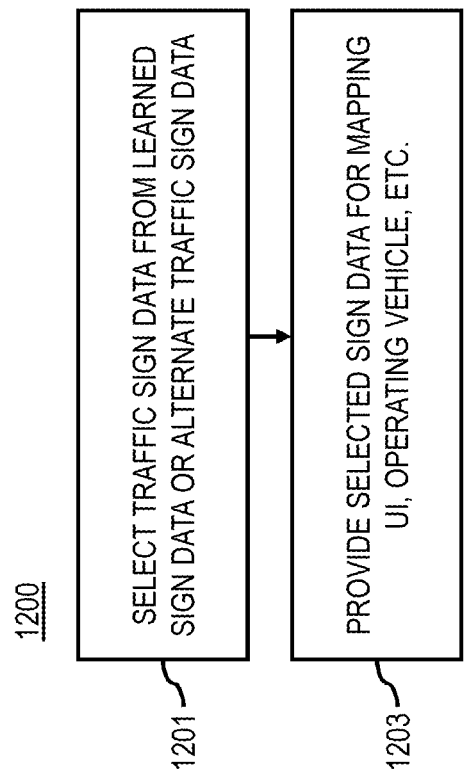
FIG. 12 is a flowchart of a process for selecting whether provide learned traffic data as an output of a mapping platform, according to one embodiment.

FIG. 12 is a flowchart that provides additional description of the process for selecting sign data from among multiple available data sources, according to one embodiment. In one embodiment, the mapping platform 111 and/or any of its modules 501-509 may perform one or more portions of the process 1200 and may be implemented in, for instance, a chip set including a processor and a memory as shown in FIG. 17. As such, the mapping platform 111 and/or the modules 501-509 can provide means for accomplishing various parts of the process 1200. In addition or alternatively, the OEM platform 115, services platform 117, and/or one or more of the services 119a-119n (also collectively referred to as services 119) may perform any combination of the steps of the process 1200 in combination with the mapping platform 111, or as standalone components. Although the process 1200 is illustrated and described as a sequence of steps, it is contemplated that various embodiments of the process 1200 may be performed in any order or combination and need not include all of the illustrated steps.

As described above, in some embodiments, the mapping platform 111 may have access to multiple sources of traffic sign data. These sources can include, but are not limited to: (1) the learned traffic sign data generated according to the embodiments described above; (2) traffic sign data generated using traditional means (e.g., fleets of mapping vehicles) during the creation of, for instance, the traditional HD map data stored in the geographic database 101; (3) third-party providers of real-time traffic sign data; and/or the like. As used herein, the term "alternate" traffic sign data refers to any traffic sign data or source of traffic sign data that is not the learned traffic sign data created from clustering TSR observations as described in the various embodiments. In addition, the alternate data sources can include both sources internal to the geographic database 101 (e.g., default traffic sign data or attributes such as those stored in HD map data of the geographic database 101 for a given road link separate from the learned traffic sign data stored in the geographic database 101 for the same road link) as well as sources external to the geographic database 101 (e.g., third party providers such as the services platform 117, services 119, and/or content providers 121). As a result, the mapping platform 111 can face significant technical challenges to ensuring data consistency when using traffic sign data that can be potentially conflicting among the various different available data sources. The process 1200 addresses these technical challenges.

In step 1201, the mapping platform 111 can select traffic sign data to use (e.g., to present to a driver, control autonomous driving, etc.) from either learned traffic sign data or alternate traffic sign data based on one or more rules. In one embodiment, these data selection rules can be stored in a data layer of the geographic data stored in the geographic database 101 (e.g., in an HD map extension filter layer). In this way, the mapping platform 111 can receive alternate sources of traffic sign data (e.g., third-party pre-processed traffic sign data) and send the alternate learned signed data to the HD map extension filter where the one or more data selection rules are applied. The application of the rules results in an output comprising a selected set of learned sign data comprising any individual source of traffic sign data or a combination of the learned sign data generated by the mapping platform 111 and/or one or more of the alternate traffic sign data. As noted, in one embodiment, the learned traffic sign data generated by the mapping platform 111 is determined based on clustering a plurality of traffic sign observations according to location data and sign property data generated using sensor data collected from a plurality of vehicles.

It is contemplated that the rules can based on any criterion or condition (e.g., from simple to complex hierarchies of criteria/conditions). In one embodiment, the mapping platform 111 can apply a simple decision rule to perform select from available data sources. For example, in a use case where the mapping platform 111 selects between learned traffic sign data and previously stored or default traffic sign data in the geographic database 101, the mapping platform 111 can apply a rule that selects the previously stored traffic sign data only when the learned traffic sign data is not available for a given link. With respect to applying this rule for a speed limit attribute, for instance, the mapping platform 111 will select an HD map stored speed limit as the final output for the given road link when the given road link does not contain a learned TSR-based speed limit. Similarly, in a use case where the mapping platform selects from between the learned signed data and any available alternate source in general, the mapping platform 111 can apply a rule that always selects the learned sign data over any other alternate data source if the learned sign data (e.g., TSR-based traffic sign data) is available for the given road link. The favoring of the learned traffic sign data, for instance, assumes that the because the learned traffic sign data can be generated at a much higher frequency (e.g., every 24 hours or every X hours) than the stored sign data (e.g., HD map data), the learned traffic sign may have a higher likelihood of representing current conditions.

In a more complex embodiment where the alternate traffic sign data is available from stored default data as well as at least one alternate traffic sign service (e.g., a third-party real-time provider), the mapping platform 111 can apply rules that take all three or more of the available data sources into consideration. In other words, the mapping platform 111 can apply data selection rules that select from among the alternate traffic sign data, the learned traffic sign data, and a traffic sign attribute stored for the road link the geographic database 101. For example, in this case, the selecting of the traffic sign data can be based on a historic and/or real-time confidence level, a historic and/or real-time accuracy level, or a combination thereof of the alternate traffic sign data, the learned traffic sign data, the traffic sign attribute, the geographic database, the alternate traffic sign service, or a combination thereof.

As discussed above, during supervised learning of traffic sign data from clustered TSR observations, the mapping platform 111 can compute a confidence metric indicating the likelihood that learned traffic sign data is indicative of an actual sign occurring on a given road segment or link. If a similar confidence metric is available for the other alternate data sources, the mapping platform 111 can apply a data selection rule that selects which traffic sign data to output based on their respective confidence metrics (e.g., selecting the traffic sign data associated with a highest confidence value). This confidence can be a "real-time" or instantaneous confidence associated with just the set of traffic sign data under consideration (e.g., confidence metric for the aggregated last 24 hours or X hours of TSR observations), or associated with a "historic" aggregation of confidence metrics (e.g., mean confidence metric for learned signs for a given link over a predetermined period). As similar comparison can be made for accuracy levels computed for the different data sources (e.g., computed as describe previously or equivalent). In yet another embodiment, the confidence and/or accuracy levels can be computed for each source, each set of traffic sign data, a given link, a given area in which the link is located, and/or the like. It is noted that confidence and accuracy are provided herein as examples of criteria that can be used in data selection rules and are not intended as limitations. For example, data selection criteria such as data freshness (e.g., most recently acquired or learned traffic sign data), number of samples or observations used to generate the traffic sign data, etc. can also be used.

Figure 13:
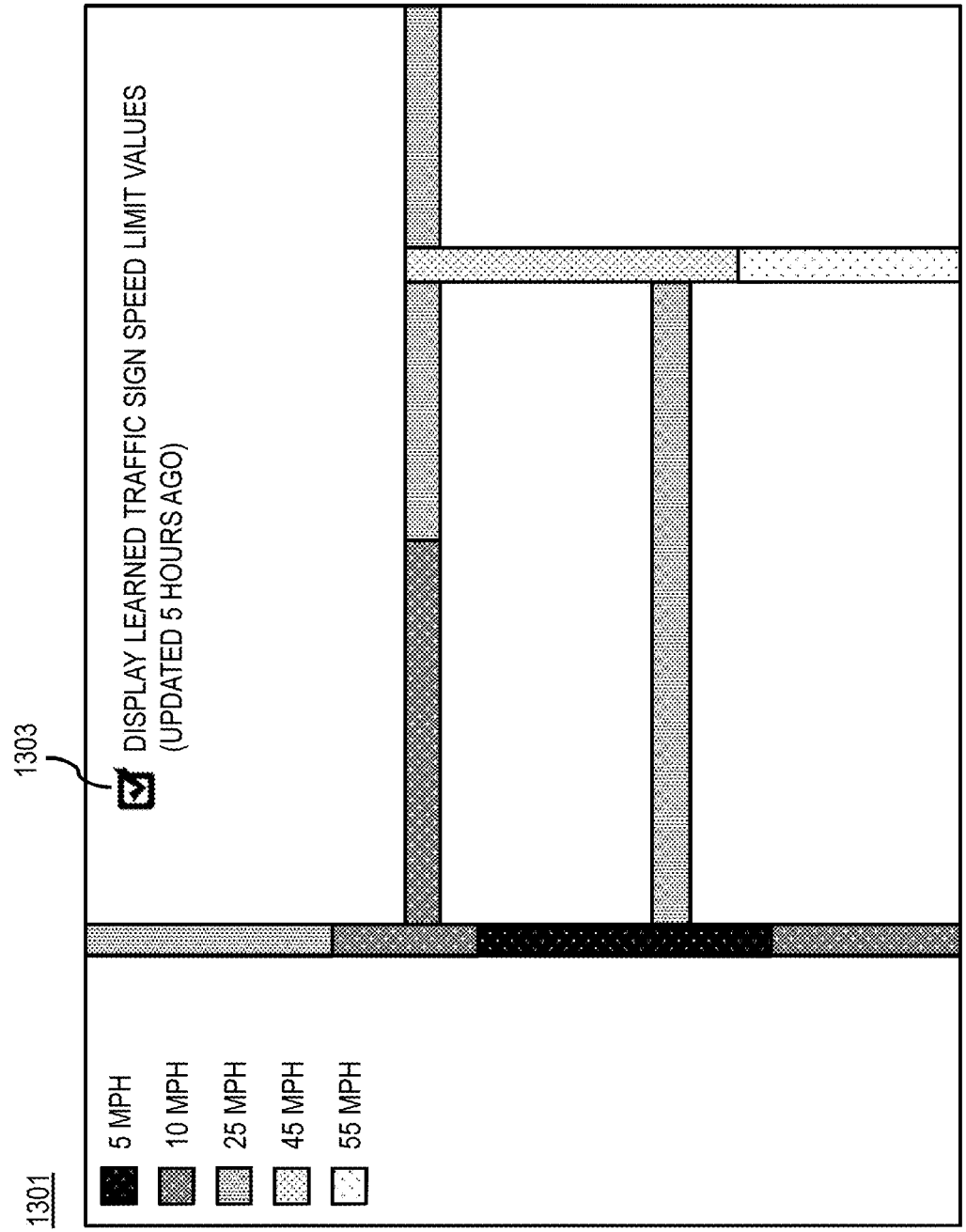
FIG. 13 is a diagram of a mapping user interface presenting learned traffic sign data, according to one embodiment.

After the data selection rules are applied to select from among available traffic sign data, the mapping platform 111 provides the selected traffic sign data for presenting a mapping user interface on a device, operating an autonomous vehicle, generating road attributes values for the geographic database 101, and/or any other use case for the traffic sign data (step 1203). For example, FIG. 13 is a diagram of a mapping user interface (UI) 1301 presenting learned traffic sign data, according to one embodiment. In the example of FIG. 13, a user has selected an option 1303 to display learned traffic sign speed limit values. Based on this selection, the mapping platform 111 provides learned traffic sign data to, for instance, a user device (e.g., a navigation system of the vehicle 103, a user device such as a user equipment (UE) 123 executing an application 125 capable of presenting the mapping UI 1301. The learned traffic sign speed limits values are based on TSR observations collected from other vehicles 103 that have previously traveled in the same area as the vehicle 103 of the current requesting user. The UE 123 or the navigation system of the vehicle 103 then uses the learned traffic sign data to generate visual representations of the learned traffic speed limit values overlaid on the representations of the corresponding road links of interest. As shown in UI 1301, a color coding system is used to indicate learned speed limit values (e.g., from 5 mph to 55 mph) for each displayed road link.

Figure 14:
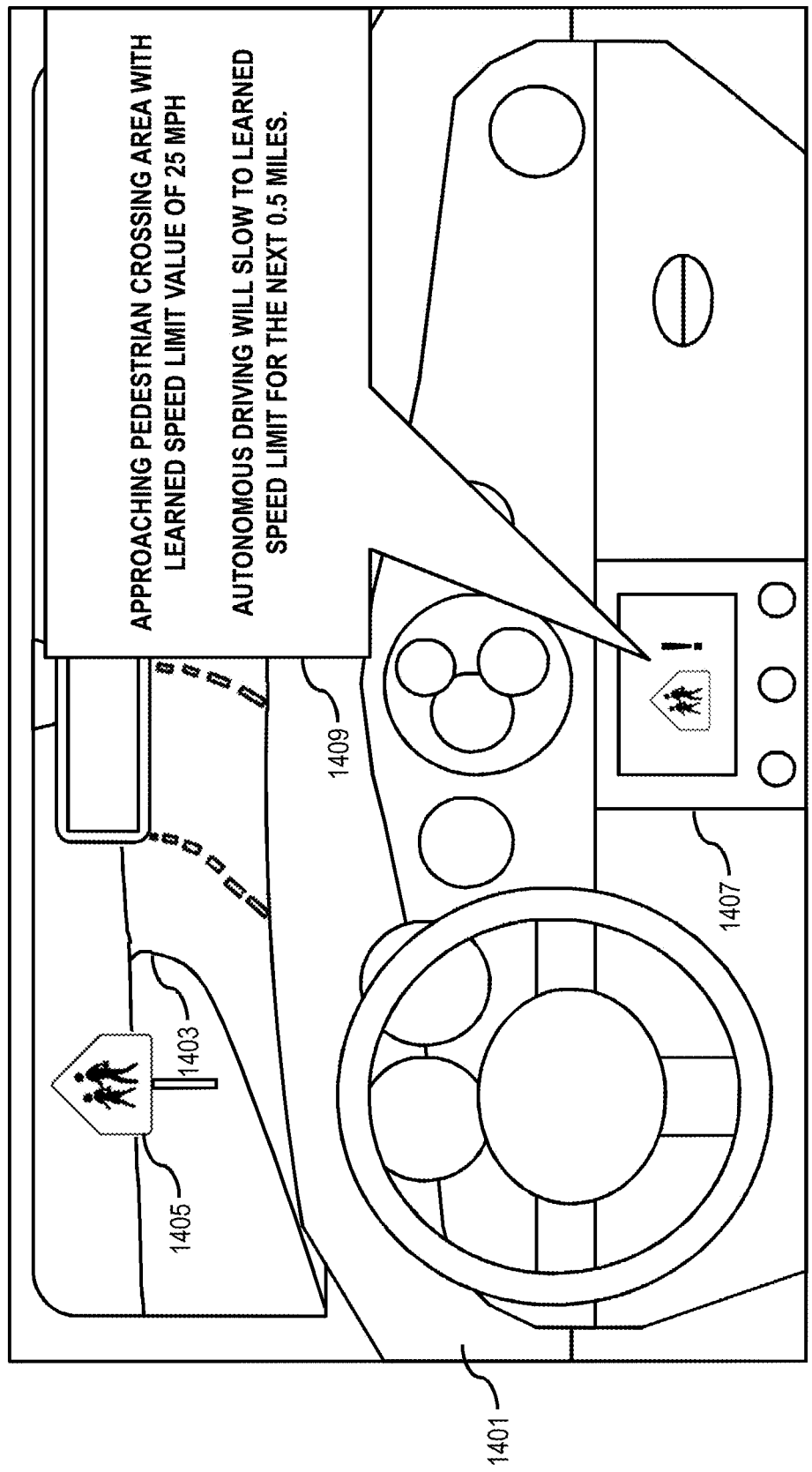
FIG. 14 is a diagram illustrating an example of using learned traffic sign data for autonomous driving, according to one embodiment.

FIG. 14 is a diagram illustrating an example of using learned traffic sign data for autonomous driving, according to one embodiment. In the example of FIG. 14, a vehicle 1401 is driving autonomously and approaches a road segment 1403 with a posted traffic sign 1405 indicating a pedestrian crossing area. In this jurisdiction, a pedestrian crossing traffic sign 1405 indicates a corresponding default speed limit of 25 mph absent any other posted speed limit. The mapping platform 111 has received TSR observations from the area and has learned a speed limit value of 25 mph for the road segment 1403. Accordingly, as the vehicle approaches the road segment 1403, the mapping platform 111 can provide (e.g., over a communication network 127) the learned traffic speed limit for the road segment 1403. In response, the vehicle 1401 can modify its autonomous driving accordingly (e.g., automatically slowing down to the learned speed limit). While no message need be shown to the driver or passengers of the vehicle 1401, in this example (for illustration purposes), a navigation system 1407 of the vehicle 1401 can present an alert 1409 that the vehicle 1401 is approaching a pedestrian crossing area with a learned speed limit of 25 mph, and that the vehicle 1401 will be slowing down accordingly for the length of the corresponding road segment 1403 (e.g., 0.5 miles).

Returning to FIG. 1, as shown, the system 100 includes a consumer or OEM vehicle 103 with connectivity to the mapping platform 111 and/or OEM platform 115 for providing TSR observations, determining learned traffic sign data, and/or using the learned traffic sign data according to the various embodiments described herein. In one embodiment, the vehicle 103 includes the computer vision system 109 with sensors 105 and an in-vehicle feature detector 113 for generating TSR observations for traffic sign learning. In some use cases, with respect to autonomous, navigation, mapping, and/or other similar applications, the in-vehicle feature detector 113 can detect traffic signs and their properties from input sensor data and generate.

In one embodiment, the mapping platform 111 can include a similar supervised learning mechanism that can include one or more feature detection models such as, but not limited to, neural networks, SVMs, decision trees, etc. to learn signs and sign properties from clustered TSR observations and make confidence calculations regarding the learned signs and/or properties. For example, the supervise learning mechanism can be based on a neural network such as a traditional convolutional neural network which consists of multiple layers of collections of one or more neurons (e.g., processing nodes of the neural network) which are configured to process input feature sets.

In one embodiment, the mapping platform 111, vehicle 103, UE 123, and/or other end user devices also have connectivity or access to the geographic database 101 which stores representations of mapped geographic features to facilitate autonomous driving and/or other mapping/navigation-related applications or services. The geographic database 101 can also store learned traffic sign data, as well as rules or filters for post-processing the learned traffic sign data and/or the TSR observations used for learning the traffic sign data according to the various embodiments described herein.

In one embodiment, the mapping platform 111, OEM platform 115, vehicle 103, UE 123, etc. have connectivity over the communication network 127 to the services platform 117 that provides one or more services 119 related to traffic sign learning (e.g., third-party traffic sign data services). By way of example, the services 119 may be third party services and include mapping services, navigation services, travel planning services, notification services, social networking services, content (e.g., audio, video, images, etc.) provisioning services, application services, storage services, contextual information determination services, location-based services, information-based services (e.g., weather, news, etc.), etc.

In one embodiment, the mapping platform 111, OEM platform 115, services platform 117, and/or other components of the system 100 may be platforms with multiple interconnected components. The mapping platform 111, OEM platform 115, services platform 117, etc. may include multiple servers, intelligent networking devices, computing devices, components and corresponding software for providing parametric representations of lane lines. In addition, it is noted that the mapping platform 111, OEM platform 115, computer vision system 109, etc. may be separate entities of the system 100, a part of the one or more services 119, a part of the services platform 117, or included within the UE 123 and/or vehicle 103.

In one embodiment, content providers 121a-121m (collectively referred to as content providers 121) may provide content or data (e.g., including learned traffic sign data or other geographic data) to the geographic database 101, the mapping platform 111, the computer vision system 109, the services platform 117, the services 119, the UE 123, the vehicle 103, and/or an application 125 executing on the UE 123. The content provided may be any type of content, such as map content, textual content, audio content, video content, image content, etc. In one embodiment, the content providers 121 may provide content that may aid in the detecting and classifying of traffic signs and their properties from sensor data (e.g., image data), and estimating the confidence and/or accuracy of the detected features. In one embodiment, the content providers 121 may also store content associated with the geographic database 101, mapping platform 111, OEM platform 115, computer vision system 109, services platform 117, services 119, UE 123, and/or vehicle 103. In another embodiment, the content providers 121 may manage access to a central repository of data, and offer a consistent, standard interface to data, such as a repository of the geographic database 101.

In one embodiment, the UE 123 and/or vehicle 103 may execute a software application 125 to collect, encode, and/or decode TSR observations for automated traffic sign learning according the embodiments described herein. By way of example, the application 125 may also be any type of application that is executable on the UE 123 and/or vehicle 103, such as autonomous driving applications, mapping applications, location-based service applications, navigation applications, content provisioning services, camera/imaging application, media player applications, social networking applications, calendar applications, and the like. In one embodiment, the application 125 may act as a client for the mapping platform 111, OEM platform 115, services platform 117, and/or services 119 and perform one or more functions associated with traffic sign learning.

By way of example, the UE 123 is any type of embedded system, mobile terminal, fixed terminal, or portable terminal including a built-in navigation system, a personal navigation device, mobile handset, station, unit, device, multimedia computer, multimedia tablet, Internet node, communicator, desktop computer, laptop computer, notebook computer, netbook computer, tablet computer, personal communication system (PCS) device, personal digital assistants (PDAs), audio/video player, digital camera/camcorder, positioning device, fitness device, television receiver, radio broadcast receiver, electronic book device, game device, or any combination thereof, including the accessories and peripherals of these devices, or any combination thereof. It is also contemplated that the UE 123 can support any type of interface to the user (such as "wearable" circuitry, etc.). In one embodiment, the UE 123 may be associated with the vehicle 103 or be a component part of the vehicle 103.

In one embodiment, the UE 123 and/or vehicle 103 are configured with various sensors for generating or collecting environmental sensor data (e.g., for processing by the in-vehicle feature detector 113 and/or mapping platform 111), related geographic data, etc. including but not limited to, optical, radar, ultrasonic, LiDAR, etc. sensors. In one embodiment, the sensed data represent sensor data associated with a geographic location or coordinates at which the sensor data was collected. By way of example, the sensors may include a global positioning sensor for gathering location data (e.g., GPS), a network detection sensor for detecting wireless signals or receivers for different short-range communications (e.g., Bluetooth, Wi-Fi, Li-Fi, near field communication (NFC) etc.), temporal information sensors, a camera/imaging sensor for gathering image data (e.g., the camera sensors may automatically capture road sign information, images of road obstructions, etc. for analysis), an audio recorder for gathering audio data, velocity sensors mounted on steering wheels of the vehicles, switch sensors for determining whether one or more vehicle switches are engaged, and the like.

Other examples of sensors of the UE 123 and/or vehicle 103 may include light sensors, orientation sensors augmented with height sensors and acceleration sensor (e.g., an accelerometer can measure acceleration and can be used to determine orientation of the vehicle), tilt sensors to detect the degree of incline or decline of the vehicle along a path of travel, moisture sensors, pressure sensors, etc. In a further example embodiment, sensors about the perimeter of the UE 123 and/or vehicle 103 may detect the relative distance of the vehicle from a lane or roadway, the presence of other vehicles, pedestrians, traffic lights, potholes and any other objects, or a combination thereof. In one scenario, the sensors may detect weather data, traffic information, or a combination thereof. In one embodiment, the UE 123 and/or vehicle 103 may include GPS or other satellite-based receivers to obtain geographic coordinates from satellites for determining current location and time. Further, the location can be determined by visual odometry, triangulation systems such as A-GPS, Cell of Origin, or other location extrapolation technologies. In yet another embodiment, the sensors can determine the status of various control elements of the car, such as activation of wipers, use of a brake pedal, use of an acceleration pedal, angle of the steering wheel, activation of hazard lights, activation of head lights, etc.

In one embodiment, the communication network 127 of system 100 includes one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

By way of example, the mapping platform 111, OEM platform, services platform 117, services 119, UE 123, vehicle 103, and/or content providers 121 communicate with each other and other components of the system 100 using well known, new or still developing protocols. In this context, a protocol includes a set of rules defining how the network nodes within the communication network 127 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 15:
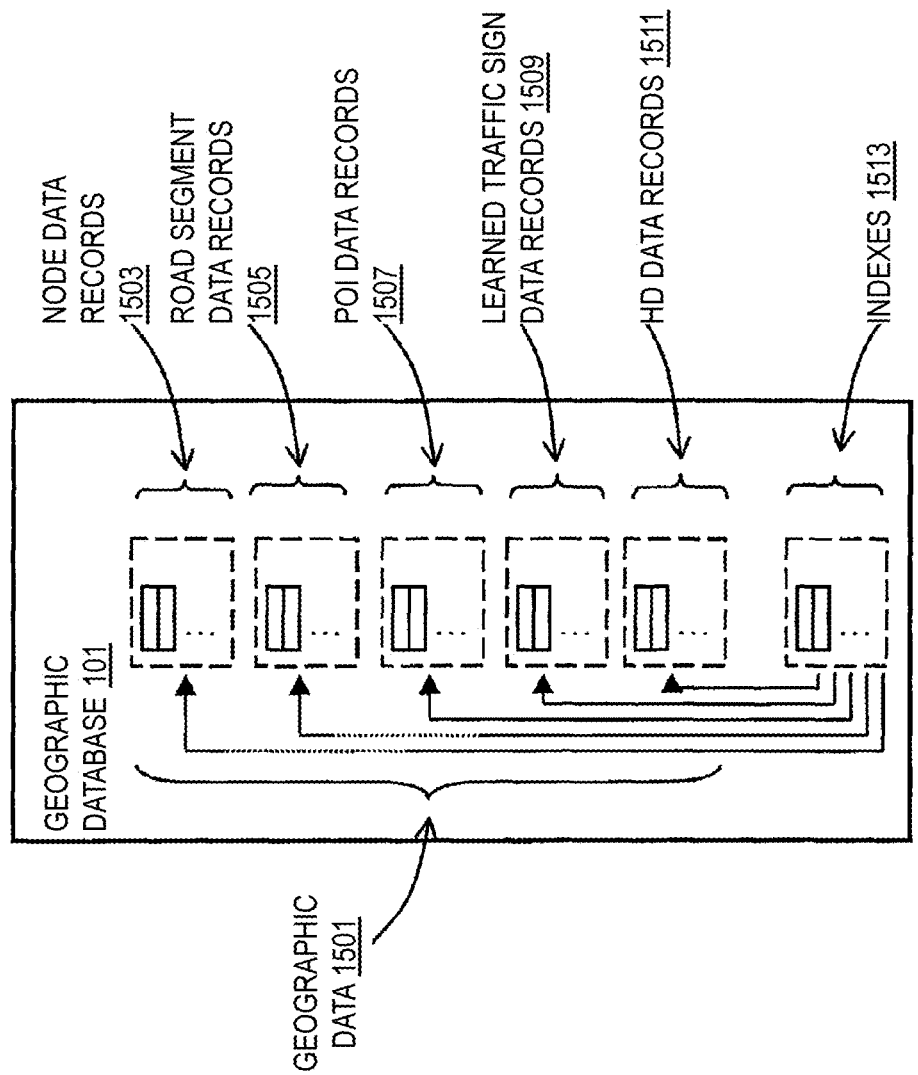
FIG. 15 is a diagram of a geographic database, according to one embodiment.

FIG. 15 is a diagram of a geographic database 101, according to one embodiment. In one embodiment, the geographic database 101 includes geographic data 1501 used for (or configured to be compiled to be used for) mapping and/or navigation-related services, such as for video odometry based on the parametric representation of lanes include, e.g., encoding and/or decoding parametric representations into lane lines. In one embodiment, the geographic database 101 include high resolution or high definition (HD) mapping data that provide centimeter-level or better accuracy of map features. For example, the geographic database 101 can be based on Light Detection and Ranging (LiDAR) or equivalent technology to collect billions of 3D points and model road surfaces and other map features down to the number lanes and their widths. In one embodiment, the HD mapping data (e.g., HD data records 1511) capture and store details such as the slope and curvature of the road, lane markings, roadside objects such as sign posts, including what the signage denotes. By way of example, the HD mapping data enable highly automated vehicles to precisely localize themselves on the road, and to determine road attributes (e.g., learned speed limit values) to at high accuracy levels.

In one embodiment, geographic features (e.g., two-dimensional or three-dimensional features) are represented using polygons (e.g., two-dimensional features) or polygon extrusions (e.g., three-dimensional features). For example, the edges of the polygons correspond to the boundaries or edges of the respective geographic feature. In the case of a building, a two-dimensional polygon can be used to represent a footprint of the building, and a three-dimensional polygon extrusion can be used to represent the three-dimensional surfaces of the building. It is contemplated that although various embodiments are discussed with respect to two-dimensional polygons, it is contemplated that the embodiments are also applicable to three-dimensional polygon extrusions. Accordingly, the terms polygons and polygon extrusions as used herein can be used interchangeably.

In one embodiment, the following terminology applies to the representation of geographic features in the geographic database 101.

"Node"—A point that terminates a link.

"Line segment"—A straight line connecting two points.

"Link" (or "edge")—A contiguous, non-branching string of one or more line segments terminating in a node at each end.

"Shape point"—A point along a link between two nodes (e.g., used to alter a shape of the link without defining new nodes).

"Oriented link"—A link that has a starting node (referred to as the "reference node") and an ending node (referred to as the "non reference node").

"Simple polygon"—An interior area of an outer boundary formed by a string of oriented links that begins and ends in one node. In one embodiment, a simple polygon does not cross itself.

"Polygon"—An area bounded by an outer boundary and none or at least one interior boundary (e.g., a hole or island). In one embodiment, a polygon is constructed from one outer simple polygon and none or at least one inner simple polygon. A polygon is simple if it just consists of one simple polygon, or complex if it has at least one inner simple polygon.

In one embodiment, the geographic database 101 follows certain conventions. For example, links do not cross themselves and do not cross each other except at a node. Also, there are no duplicated shape points, nodes, or links. Two links that connect each other have a common node. In the geographic database 101, overlapping geographic features are represented by overlapping polygons. When polygons overlap, the boundary of one polygon crosses the boundary of the other polygon. In the geographic database 101, the location at which the boundary of one polygon intersects they boundary of another polygon is represented by a node. In one embodiment, a node may be used to represent other locations along the boundary of a polygon than a location at which the boundary of the polygon intersects the boundary of another polygon. In one embodiment, a shape point is not used to represent a point at which the boundary of a polygon intersects the boundary of another polygon.

In one embodiment, the geographic database 101 is stored as a hierarchical or multi-level tile-based projection or structure. More specifically, in one embodiment, the geographic database 101 may be defined according to a normalized Mercator projection. Other projections may be used. By way of example, the map tile grid of a Mercator or similar projection is a multilevel grid. Each cell or tile in a level of the map tile grid is divisible into the same number of tiles of that same level of grid. In other words, the initial level of the map tile grid (e.g., a level at the lowest zoom level) is divisible into four cells or rectangles. Each of those cells are in turn divisible into four cells, and so on until the highest zoom or resolution level of the projection is reached.

In one embodiment, the map tile grid may be numbered in a systematic fashion to define a tile identifier (tile ID). For example, the top left tile may be numbered 00, the top right tile may be numbered 01, the bottom left tile may be numbered 10, and the bottom right tile may be numbered 11. In one embodiment, each cell is divided into four rectangles and numbered by concatenating the parent tile ID and the new tile position. A variety of numbering schemes also is possible. Any number of levels with increasingly smaller geographic areas may represent the map tile grid. Any level (n) of the map tile grid has 2(n+1) cells. Accordingly, any tile of the level (n) has a geographic area of A/2(n+1) where A is the total geographic area of the world or the total area of the map tile grid 10. Because of the numbering system, the exact position of any tile in any level of the map tile grid or projection may be uniquely determined from the tile ID.

In one embodiment, the system 100 may identify a tile by a quadkey determined based on the tile ID of a tile of the map tile grid. The quadkey, for example, is a one-dimensional array including numerical values. In one embodiment, the quadkey may be calculated or determined by interleaving the bits of the row and column coordinates of a tile in the grid at a specific level. The interleaved bits may be converted to a predetermined base number (e.g., base 10, base 4, hexadecimal). In one example, leading zeroes are inserted or retained regardless of the level of the map tile grid in order to maintain a constant length for the one-dimensional array of the quadkey. In another example, the length of the one-dimensional array of the quadkey may indicate the corresponding level within the map tile grid 10. In one embodiment, the quadkey is an example of the hash or encoding scheme of the respective geographical coordinates of a geographical data point that can be used to identify a tile in which the geographical data point is located.

As shown, the geographic database 101 includes node data records 1503, road segment or link data records 1505, POI data records 1507, learned traffic sign data records 1509, HD mapping data records 1511, and indexes 1513, for example. More, fewer or different data records can be provided. In one embodiment, additional data records (not shown) can include cartographic ("carto") data records, routing data, and maneuver data. In one embodiment, the indexes 1513 may improve the speed of data retrieval operations in the geographic database 101. In one embodiment, the indexes 1513 may be used to quickly locate data without having to search every row in the geographic database 101 every time it is accessed. For example, in one embodiment, the indexes 1513 can be a spatial index of the polygon points associated with stored feature polygons.

In exemplary embodiments, the road segment data records 1505 are links or segments representing roads, streets, or paths, as can be used in the calculated route or recorded route information for determination of one or more personalized routes. The node data records 1503 are end points corresponding to the respective links or segments of the road segment data records 1505. The road link data records 1505 and the node data records 1503 represent a road network, such as used by vehicles, cars, and/or other entities. Alternatively, the geographic database 101 can contain path segment and node data records or other data that represent pedestrian paths or areas in addition to or instead of the vehicle road record data, for example.

The road/link segments and nodes can be associated with attributes, such as geographic coordinates, street names, address ranges, speed limits, turn restrictions at intersections, and other navigation related attributes, as well as POIs, such as gasoline stations, hotels, restaurants, museums, stadiums, offices, automobile dealerships, auto repair shops, buildings, stores, parks, etc. The geographic database 101 can include data about the POIs and their respective locations in the POI data records 1507. The geographic database 101 can also include data about places, such as cities, towns, or other communities, and other geographic features, such as bodies of water, mountain ranges, etc. Such place or feature data can be part of the POI data records 1507 or can be associated with POIs or POI data records 1507 (such as a data point used for displaying or representing a position of a city).

In one embodiment, the geographic database 101 can also include learned traffic sign data records 1509 for storing TSR observations (e.g., including negative observations determined according to the embodiments described herein) as well as data on learned signs and their respective properties. In addition, the learned traffic sign data records 1509 can store post-processing rule sets for propagating, correcting, and/or reducing the uncertainties in the traffic sign data learned from clustered TSR observations. The learned traffic sign data records 1509 can also store data selection rules (e.g., in a map data extension layer) for selecting from among multiple sets of traffic sign data that may be available for a given road link. The traffic sign data records 1509 can also store confidence or accuracy determinations for the learned traffic sign data. By way of example, the traffic sign data records 1509 can be associated with one or more of the node records 1503, road segment records 1505, and/or POI data records 1507 to support uses cases such as enhanced mapping UIs, autonomous driving, dynamic map updates, etc. In one embodiment, the feature detection data records 1509 are stored as a data layer of the hierarchical tile-based structure of the geographic database 101 according to the various embodiments described herein. In one embodiment, the geographic database 101 can provide the tile-based feature detection data records 1509 to automatic traffic sign data propagation in a road network using clustered TSR observations.

In one embodiment, as discussed above, the HD mapping data records 1511 model road surfaces and other map features to centimeter-level or better accuracy. The HD mapping data records 1511 also include lane models that provide the precise lane geometry with lane boundaries, as well as rich attributes of the lane models. These rich attributes include, but are not limited to, lane traversal information, lane types, lane marking types, lane level speed limit information, and/or the like. In one embodiment, the HD mapping data records 1511 are divided into spatial partitions of varying sizes to provide HD mapping data to vehicles 103 and other end user devices with near real-time speed without overloading the available resources of the vehicles 103 and/or devices (e.g., computational, memory, bandwidth, etc. resources).

In one embodiment, the HD mapping data records 1511 are created from high-resolution 3D mesh or point-cloud data generated, for instance, from LiDAR-equipped vehicles. The 3D mesh or point-cloud data are processed to create 3D representations of a street or geographic environment at centimeter-level accuracy for storage in the HD mapping data records 1511.

In one embodiment, the HD mapping data records 1511 also include real-time sensor data collected from probe vehicles in the field. The real-time sensor data, for instance, integrates real-time traffic information, weather, and road conditions (e.g., potholes, road friction, road wear, etc.) with highly detailed 3D representations of street and geographic features to provide precise real-time also at centimeter-level accuracy. Other sensor data can include vehicle telemetry or operational data such as windshield wiper activation state, braking state, steering angle, accelerator position, and/or the like.

In one embodiment, the geographic database 101 can be maintained by the content provider 121 in association with the services platform 117 (e.g., a map developer). The map developer can collect geographic data to generate and enhance the geographic database 101. There can be different ways used by the map developer to collect data. These ways can include obtaining data from other sources, such as municipalities or respective geographic authorities. In addition, the map developer can employ field personnel to travel by vehicle (e.g., vehicle 103 and/or UE 123) along roads throughout the geographic region to observe features and/or record information about them, for example. Also, remote sensing, such as aerial or satellite photography, can be used.

The geographic database 101 can be a master geographic database stored in a format that facilitates updating, maintenance, and development. For example, the master geographic database or data in the master geographic database can be in an Oracle spatial format or other spatial format, such as for development or production purposes. The Oracle spatial format or development/production database can be compiled into a delivery format, such as a geographic data files (GDF) format. The data in the production and/or delivery formats can be compiled or further compiled to form geographic database products or databases, which can be used in end user navigation devices or systems.

For example, geographic data is compiled (such as into a platform specification format (PSF)) to organize and/or configure the data for performing navigation-related functions and/or services, such as route calculation, route guidance, map display, speed calculation, distance and travel time functions, and other functions, by a navigation device, such as by a vehicle 103 or UE 123. The navigation-related functions can correspond to vehicle navigation, pedestrian navigation, or other types of navigation. The compilation to produce the end user databases can be performed by a party or entity separate from the map developer. For example, a customer of the map developer, such as a navigation device developer or other end user device developer, can perform compilation on a received geographic database in a delivery format to produce one or more compiled navigation databases.

The processes described herein for determining a negative observation of a traffic sign in a road network using clustered TSR observations may be advantageously implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 16:
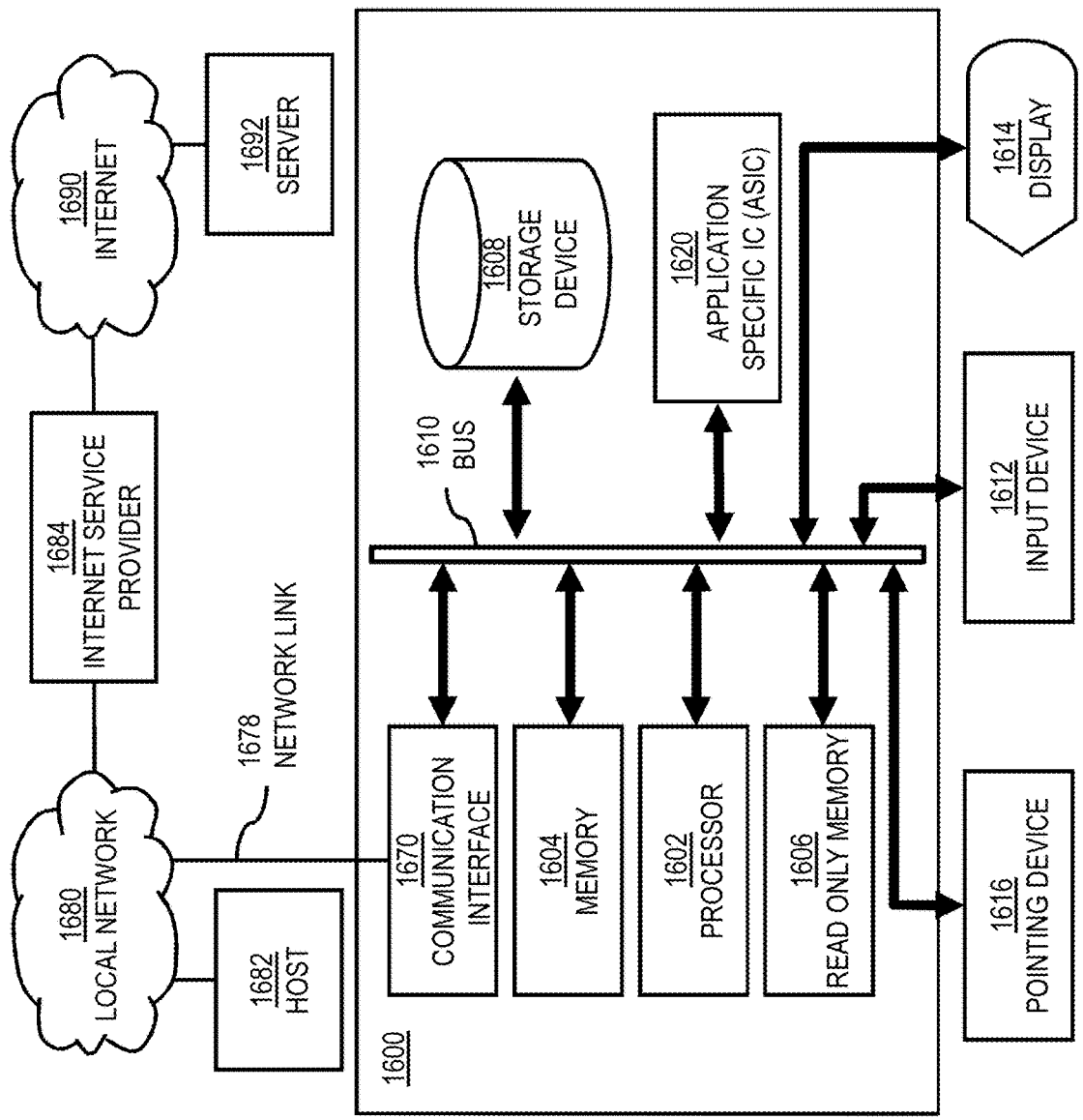
FIG. 16 is a diagram of hardware that can be used to implement an embodiment.

FIG. 16 illustrates a computer system 1600 upon which an embodiment may be implemented. Computer system 1600 is programmed (e.g., via computer program code or instructions) to determine a negative observation of a traffic sign in a road network using clustered TSR observations as described herein and includes a communication mechanism such as a bus 1610 for passing information between other internal and external components of the computer system 1600. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 1610 includes one or more parallel conductors of information so that information is transferred quickly among devices coupled to the bus 1610. One or more processors 1602 for processing information are coupled with the bus 1610.

A processor 1602 performs a set of operations on information as specified by computer program code related to determining a negative observation of a traffic sign in a road network using clustered TSR observations. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 1610 and placing information on the bus 1610. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 1602, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 1600 also includes a memory 1604 coupled to bus 1610. The memory 1604, such as a random access memory (RAM) or other dynamic storage device, stores information including processor instructions for determining a negative observation of a traffic sign in a road network using clustered TSR observations. Dynamic memory allows information stored therein to be changed by the computer system 1600. RAM allows a unit of information stored at a location called a memory address to be stored and retrieved independently of information at neighboring addresses. The memory 1604 is also used by the processor 1602 to store temporary values during execution of processor instructions. The computer system 1600 also includes a read only memory (ROM) 1606 or other static storage device coupled to the bus 1610 for storing static information, including instructions, that is not changed by the computer system 1600. Some memory is composed of volatile storage that loses the information stored thereon when power is lost. Also coupled to bus 1610 is a non-volatile (persistent) storage device 1608, such as a magnetic disk, optical disk or flash card, for storing information, including instructions, that persists even when the computer system 1600 is turned off or otherwise loses power.

Information, including instructions for determining a negative observation of a traffic sign in a road network using clustered TSR observations, is provided to the bus 1610 for use by the processor from an external input device 1612, such as a keyboard containing alphanumeric keys operated by a human user, or a sensor. A sensor detects conditions in its vicinity and transforms those detections into physical expression compatible with the measurable phenomenon used to represent information in computer system 1600. Other external devices coupled to bus 1610, used primarily for interacting with humans, include a display device 1614, such as a cathode ray tube (CRT) or a liquid crystal display (LCD), or plasma screen or printer for presenting text or images, and a pointing device 1616, such as a mouse or a trackball or cursor direction keys, or motion sensor, for controlling a position of a small cursor image presented on the display 1614 and issuing commands associated with graphical elements presented on the display 1614. In some embodiments, for example, in embodiments in which the computer system 1600 performs all functions automatically without human input, one or more of external input device 1612, display device 1614 and pointing device 1616 is omitted.

In the illustrated embodiment, special purpose hardware, such as an application specific integrated circuit (ASIC) 1620, is coupled to bus 1610. The special purpose hardware is configured to perform operations not performed by processor 1602 quickly enough for special purposes. Examples of application specific ICs include graphics accelerator cards for generating images for display 1614, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 1600 also includes one or more instances of a communications interface 1670 coupled to bus 1610. Communication interface 1670 provides a one-way or two-way communication coupling to a variety of external devices that operate with their own processors, such as printers, scanners and external disks. In general, the coupling is with a network link 1678 that is connected to a local network 1680 to which a variety of external devices with their own processors are connected. For example, communication interface 1670 may be a parallel port or a serial port or a universal serial bus (USB) port on a personal computer. In some embodiments, communications interface 1670 is an integrated services digital network (ISDN) card or a digital subscriber line (DSL) card or a telephone modem that provides an information communication connection to a corresponding type of telephone line. In some embodiments, a communication interface 1670 is a cable modem that converts signals on bus 1610 into signals for a communication connection over a coaxial cable or into optical signals for a communication connection over a fiber optic cable. As another example, communications interface 1670 may be a local area network (LAN) card to provide a data communication connection to a compatible LAN, such as Ethernet. Wireless links may also be implemented. For wireless links, the communications interface 1670 sends or receives or both sends and receives electrical, acoustic or electromagnetic signals, including infrared and optical signals, that carry information streams, such as digital data. For example, in wireless handheld devices, such as mobile telephones like cell phones, the communications interface 1670 includes a radio band electromagnetic transmitter and receiver called a radio transceiver. In certain embodiments, the communications interface 1670 enables connection to the communication network 127 for determining a negative observation of a traffic sign in a road network using clustered TSR observations.

The term computer-readable medium is used herein to refer to any medium that participates in providing information to processor 1602, including instructions for execution. Such a medium may take many forms, including, but not limited to, non-volatile media, volatile media and transmission media. Non-volatile media include, for example, optical or magnetic disks, such as storage device 1608. Volatile media include, for example, dynamic memory 1604. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

FIG. 17 illustrates a chip set 1700 upon which an embodiment may be implemented. Chip set 1700 is programmed to determine a negative observation of a traffic sign in a road network using clustered TSR observations as described herein and includes, for instance, the processor and memory components described with respect to FIG. 16 incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set can be implemented in a single chip.

In one embodiment, the chip set 1700 includes a communication mechanism such as a bus 1701 for passing information among the components of the chip set 1700. A processor 1703 has connectivity to the bus 1701 to execute instructions and process information stored in, for example, a memory 1705. The processor 1703 may include one or more processing cores with each core configured to perform independently. A multi-core processor enables multiprocessing within a single physical package. Examples of a multi-core processor include two, four, eight, or greater numbers of processing cores. Alternatively or in addition, the processor 1703 may include one or more microprocessors configured in tandem via the bus 1701 to enable independent execution of instructions, pipelining, and multithreading. The processor 1703 may also be accompanied with one or more specialized components to perform certain processing functions and tasks such as one or more digital signal processors (DSP) 1707, or one or more application-specific integrated circuits (ASIC) 1709. A DSP 1707 typically is configured to process real-world signals (e.g., sound) in real time independently of the processor 1703. Similarly, an ASIC 1709 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 1703 and accompanying components have connectivity to the memory 1705 via the bus 1701. The memory 1705 includes both dynamic memory (e.g., RAM, magnetic disk, writable optical disk, etc.) and static memory (e.g., ROM, CD-ROM, etc.) for storing executable instructions that when executed perform the inventive steps described herein to determine a negative observation of a traffic sign in a road network using clustered TSR observations. The memory 1705 also stores the data associated with or generated by the execution of the inventive steps.

Figure 18:
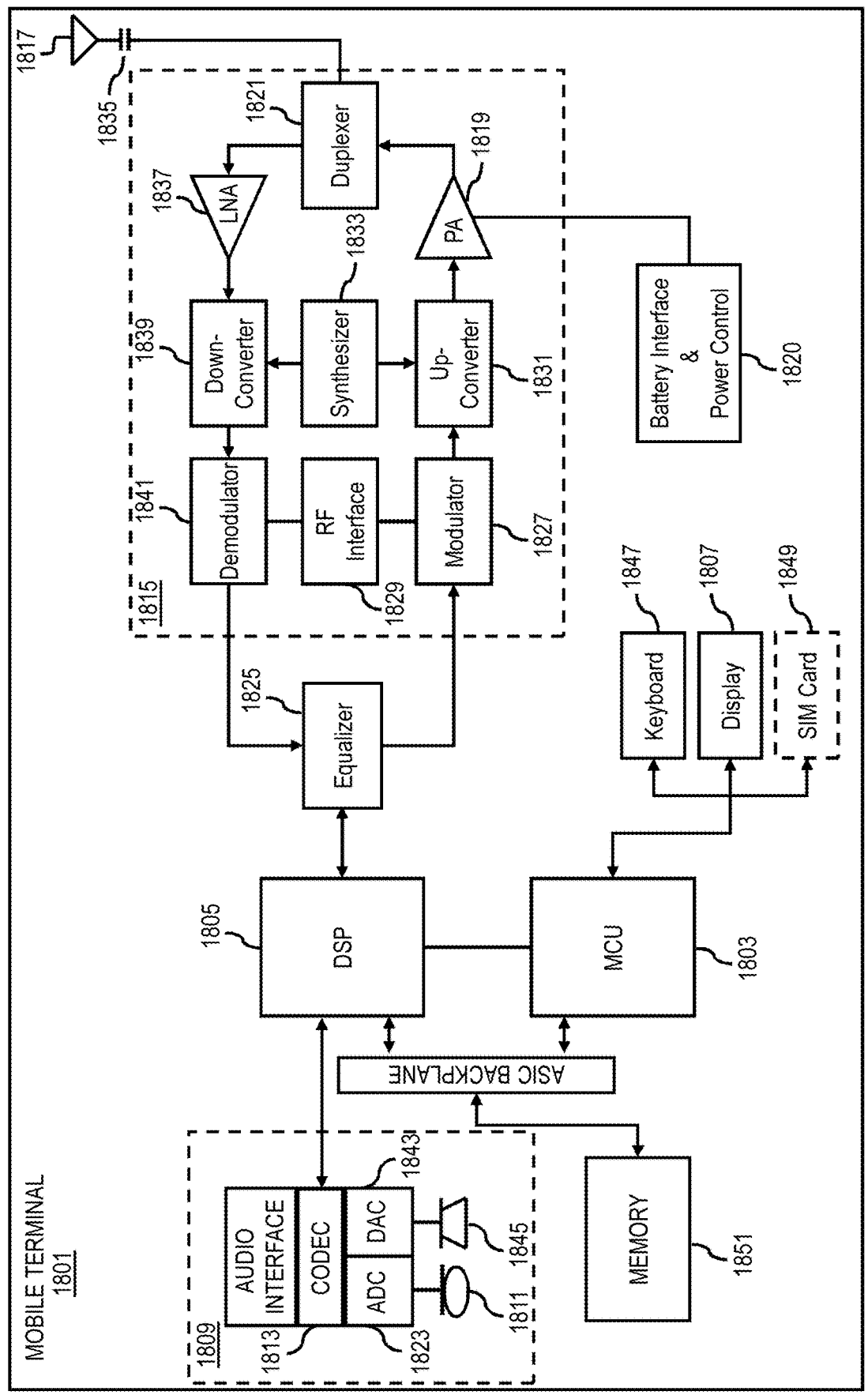
FIG. 18 is a diagram of a mobile terminal (e.g., handset or other mobile device, like a vehicle or part thereof) that can be used to implement an embodiment.

FIG. 18 is a diagram of exemplary components of a mobile terminal 1810 (e.g., handset or other mobile device, like a vehicle 103 or part thereof) capable of operating in the system of FIG. 1, according to one embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1803, a Digital Signal Processor (DSP) 1805, and a receiver/transmitter unit including a microphone gain control unit and a speaker gain control unit. A main display unit 1807 provides a display to the user in support of various applications and mobile station functions that offer automatic contact matching. An audio function circuitry 1809 includes a microphone 1811 and microphone amplifier that amplifies the speech signal output from the microphone 1811. The amplified speech signal output from the microphone 1811 is fed to a coder/decoder (CODEC) 1813.

A radio section 1815 amplifies power and converts frequency in order to communicate with a base station, which is included in a mobile communication system, via antenna 1817. The power amplifier (PA) 1819 and the transmitter/modulation circuitry are operationally responsive to the MCU 1803, with an output from the PA 1819 coupled to the duplexer 1821 or circulator or antenna switch, as known in the art. The PA 1819 also couples to a battery interface and power control unit 1820.

In use, a user of mobile station 1801 speaks into the microphone 1811 and his or her voice along with any detected background noise is converted into an analog voltage. The analog voltage is then converted into a digital signal through the Analog to Digital Converter (ADC) 1823. The control unit 1803 routes the digital signal into the DSP 1805 for processing therein, such as speech encoding, channel encoding, encrypting, and interleaving. In one embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1825 for compensation of any frequency-dependent impairments that occur during transmission though the air such as phase and amplitude distortion. After equalizing the bit stream, the modulator 1827 combines the signal with a RF signal generated in the RF interface 1829. The modulator 1827 generates a sine wave by way of frequency or phase modulation. In order to prepare the signal for transmission, an up-converter 1831 combines the sine wave output from the modulator 1827 with another sine wave generated by a synthesizer 1833 to achieve the desired frequency of transmission. The signal is then sent through a PA 1819 to increase the signal to an appropriate power level. In practical systems, the PA 1819 acts as a variable gain amplifier whose gain is controlled by the DSP 1805 from information received from a network base station. The signal is then filtered within the duplexer 1821 and optionally sent to an antenna coupler 1835 to match impedances to provide maximum power transfer. Finally, the signal is transmitted via antenna 1817 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1801 are received via antenna 1817 and immediately amplified by a low noise amplifier (LNA) 1837. A down-converter 1839 lowers the carrier frequency while the demodulator 1841 strips away the RF leaving only a digital bit stream. The signal then goes through the equalizer 1825 and is processed by the DSP 1805. A Digital to Analog Converter (DAC) 1843 converts the signal and the resulting output is transmitted to the user through the speaker 1845, all under control of a Main Control Unit (MCU) 1803—which can be implemented as a Central Processing Unit (CPU) (not shown).

The MCU 1803 receives various signals including input signals from the keyboard 1847. The keyboard 1847 and/or the MCU 1803 in combination with other user input components (e.g., the microphone 1811) comprise a user interface circuitry for managing user input. The MCU 1803 runs a user interface software to facilitate user control of at least some functions of the mobile station 1801 to determine a negative observation of a traffic sign in a road network using clustered TSR observations. The MCU 1803 also delivers a display command and a switch command to the display 1807 and to the speech output switching controller, respectively. Further, the MCU 1803 exchanges information with the DSP 1805 and can access an optionally incorporated SIM card 1849 and a memory 1851. In addition, the MCU 1803 executes various control functions required of the station. The DSP 1805 may, depending upon the implementation, perform any of a variety of conventional digital processing functions on the voice signals. Additionally, DSP 1805 determines the background noise level of the local environment from the signals detected by microphone 1811 and sets the gain of microphone 1811 to a level selected to compensate for the natural tendency of the user of the mobile station 1801.

The CODEC 1813 includes the ADC 1823 and DAC 1843. The memory 1851 stores various data including call incoming tone data and is capable of storing other data including music data received via, e.g., the global Internet. The software module could reside in RAM memory, flash memory, registers, or any other form of writable computer-readable storage medium known in the art including non-transitory computer-readable storage medium. For example, the memory device 1851 may be, but not limited to, a single memory, CD, DVD, ROM, RAM, EEPROM, optical storage, or any other non-volatile or non-transitory storage medium capable of storing digital data.

An optionally incorporated SIM card 1849 carries, for instance, important information, such as the cellular phone number, the carrier supplying service, subscription details, and security information. The SIM card 1849 serves primarily to identify the mobile station 1801 on a radio network. The card 1849 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A computer-implemented method comprising:
   querying a spatial data structure for a set of location points based on a spatial radius around a location of a traffic sign, wherein the spatial data structure stores a plurality of location points from a plurality of location traces that did not have a traffic sign observation, and wherein the plurality of location points is collected from one or more sensors of at least one vehicle;
   for each location trace in the set of location points, map matching said each location trace to a matched path of road links; and
   determining that said each location trace is a negative observation of the traffic sign based on determining that the location of the traffic sign falls between two map-matched location points of said each location trace that are on the matched path of road links,
   wherein the negative observation indicates an absence of the traffic sign.

2. The method of claim 1, wherein the location of the traffic sign is a map-matched sign location including a matched sign road link and a matched sign link offset, and wherein the two map-matched location points each include a matched point road link and a matched point offset.

3. The method of claim 2, wherein the map-matched sign location and two map-matched location points are on a same road link, and wherein the determining that the location of the traffic sign falls between the two map-matched location points is based on determining that the matched sign link offset is between the matched point offsets of the two map-matched location points.

4. The method of claim 2, wherein the map-matched sign location and a first point of the two map-matched location points are on a same road link, and a second point of the two map-matched location points is on a different road link; and wherein the method further comprises:

identifying the different road link as a preceding link of same road link based on determining that matched point offset of the first point occurs after the map-matched sign location on the same road link; and identifying the different road link as a subsequent link of the same road link based on determining the matched point offset of the first point occurs before the map-matched sign location on the same road link.

5. The method of claim 2, wherein the map-matched sign location and the two map-matched location points are on different road links, the method further comprising:

identifying the first point of the two map-matched points on a preceding link of the matched sign road link; and identifying the second point of the two map-matched points on a subsequent link of the matched sign road link.

6. The method of claim 1, wherein the determining that said each location trace is a negative observation of the traffic sign is further based on determining that a point heading of at least one location point of said each location trace and a sign heading of the traffic sign align within a threshold heading range.

7. The method of claim 1, wherein the spatial data structure is a hierarchical tree-based data structure that indexes the plurality of location points according to location.

8. The method of claim 1, further comprising:

downsampling the plurality of location traces by storing a subset of the plurality of location points in the spatial data structure.

9. The method of claim 1, wherein said each location trace is map matched using a path-based map matcher, and wherein the location of the traffic sign is map matched using a point-based matcher.

10. An apparatus comprising:

at least one processor; and at least one memory including computer program code for one or more programs, the at least one memory and the computer program code configured to, with the at least one processor, cause the apparatus to perform at least the following, retrieve a plurality of location points from a plurality of location traces collected from sensors of vehicles traveling in a road network, wherein the plurality of location points did not have road feature observations reported by the vehicles; and store the plurality of location points into a spatial data structure, wherein the spatial data structure indexes the plurality of location points according to location;

wherein the spatial data structure can be queried to identify a subset of the plurality of location points within a spatial radius of a road feature; and wherein the subset of the plurality of location points can be processed to determine a negative observation of the road feature, wherein the negative observation indicates an absence of the road feature.

11. The apparatus of claim 10, wherein the spatial data structure is a hierarchical tree-based data structure.

12. The apparatus of claim 10, wherein the apparatus is further caused to:

downsample the plurality of location traces in the spatial data structure by storing a subset of the plurality of location traces based on an available memory capacity for storing the spatial data structure.

13. The apparatus of claim 12, wherein the downsampling selects every other one of the plurality of location points for storage.

14. The apparatus of claim 10, wherein the determining of the negative observation of the road feature comprises determining that a location trace in the subset of location points indicates that a vehicle passed the road feature without reporting a road feature observation.

15. The apparatus of claim 14, wherein the location trace includes at least two location points that bracket a location of the road feature.

16. A non-transitory computer-readable storage medium carrying one or more sequences of one or more instructions which, when executed by one or more processors, cause an apparatus to perform:

querying a spatial data structure for a set of location points based on a spatial radius around a location of a traffic sign, wherein the spatial data structure stores a plurality of location points that did not have a traffic sign observation;

map matching said each location trace in the set of location points to a matched path of road links; and determining that said each location trace is a negative observation of the traffic sign based on determining that the matched path of road links indicates that a vehicle passed the location of the traffic sign without transmitting a traffic sign observation that matches the traffic sign, wherein the plurality of location points is collected from one or more sensors of at least one vehicle; and wherein the negative observation indicates an absence of the traffic sign.

17. The non-transitory computer-readable storage medium of claim 16, wherein the apparatus is further caused to perform:

determining at least two points of said each location trace that brackets the location of the traffic sign, wherein the at least two points are used to indicate that the vehicle passed the location traffic sign.

18. The non-transitory computer-readable storage medium of claim 17, wherein the apparatus is further caused to perform:

determining a heading of a location point of said each location trace as the vehicle passed the location of the traffic sign; and wherein the negative observation of the traffic sign is further based on determining that the heading of the location point aligns with a heading of the traffic sign within a threshold heading range.

19. The non-transitory computer-readable storage medium of claim 16, wherein the apparatus is further caused to perform:

validating a presence of the traffic sign based on the negative observation of the traffic sign.

20. The non-transitory computer-readable storage medium of claim 19, wherein the validating is based on a number of the negative observations of the traffic sign determined for the subset of the plurality of location points.

* * * * *